United States Patent
Fujii et al.

(10) Patent No.: US 10,142,672 B2
(45) Date of Patent: Nov. 27, 2018

(54) RECEIVER DEVICE

(71) Applicant: Sony Corporation, Tokyo (JP)

(72) Inventors: Masaru Fujii, Tokyo (JP); Toshikazu Yoshida, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/769,204

(22) PCT Filed: Jan. 28, 2014

(86) PCT No.: PCT/JP2014/000406
§ 371 (c)(1),
(2) Date: Aug. 20, 2015

(87) PCT Pub. No.: WO2014/132557
PCT Pub. Date: Sep. 4, 2014

(65) Prior Publication Data
US 2015/0382049 A1 Dec. 31, 2015

(30) Foreign Application Priority Data
Mar. 1, 2013 (JP) .................... 2013-041237

(51) Int. Cl.
| H04N 21/426 | (2011.01) |
| H04N 5/44 | (2011.01) |
| H04N 5/46 | (2006.01) |
| H04N 5/40 | (2006.01) |
| H04N 21/40 | (2011.01) |
| H04N 5/50 | (2006.01) |

(52) U.S. Cl.
CPC ..... *H04N 21/42638* (2013.01); *H04N 5/4401* (2013.01); *H04N 5/46* (2013.01); *H04N 5/50* (2013.01); *H04N 21/40* (2013.01)

(58) Field of Classification Search
CPC .. H04N 21/42638; H04N 5/4401; H04N 5/46; H04N 5/50
See application file for complete search history.

(56) References Cited

U.S. PATENT DOCUMENTS 5,227,863 A * 7/1993 Bilbrey ................. H04N 5/262
348/578
5,475,876 A * 12/1995 Terada .................... H04B 1/38
361/816

(Continued)

FOREIGN PATENT DOCUMENTS

| CN | 101047396 A | 10/2007 |
| CN | 101099382 A | 1/2008 |

(Continued)

OTHER PUBLICATIONS

Chinese Office Action dated Nov. 27, 2017 in connection with Chinese Application No. 201480010439.0 and English translation thereof.

Primary Examiner — Brian P Yenke
(74) Attorney, Agent, or Firm — Wolf, Greenfield & Sacks, P.C.

(57) ABSTRACT

There is provided a receiver device including a first input terminal, a second input terminal, a first distribution circuit, a second distribution circuit, a first high-frequency processing unit, and a second high-frequency processing unit.

8 Claims, 13 Drawing Sheets

(56) References Cited

U.S. PATENT DOCUMENTS

| | | | | |
|---|---|---|---|---|
| 5,854,507 A * | 12/1998 | Miremadi | H01L 25/105 | 257/685 |
| 6,014,313 A * | 1/2000 | Hesselbom | H01L 25/0652 | 174/16.3 |
| 6,040,851 A * | 3/2000 | Cheng | H04N 21/4181 | 348/E5.002 |
| 6,177,964 B1 * | 1/2001 | Birleson | H03D 7/161 | 348/725 |
| 6,377,316 B1 * | 4/2002 | Mycynek | H04B 1/0003 | 348/638 |
| 6,731,349 B1 * | 5/2004 | Van Der Wijst | H03J 5/24 | 348/536 |
| 6,741,293 B1 * | 5/2004 | Obuchi | H04N 3/27 | 348/554 |
| 6,757,029 B2 * | 6/2004 | Kurihara | H04N 5/4401 | 348/725 |
| 6,760,079 B2 * | 7/2004 | Morisada | H03J 5/24 | 348/731 |
| 6,925,291 B2 * | 8/2005 | Pugel | H03J 5/244 | 331/16 |
| 7,061,542 B1 * | 6/2006 | Ikeguchi | H04N 5/46 | 348/558 |
| 7,092,042 B2 * | 8/2006 | Ikeguchi | H03L 7/06 | 348/505 |
| 7,123,309 B2 * | 10/2006 | Yoda | H03J 5/244 | 348/731 |
| 7,298,426 B2 * | 11/2007 | Yamamoto | H03J 5/244 | 348/731 |
| 7,405,772 B2 * | 7/2008 | Yukiyoshi | H04H 20/71 | 348/570 |
| 7,414,676 B2 * | 8/2008 | Lindstrom | H03J 1/0083 | 348/725 |
| 7,430,019 B2 * | 9/2008 | Kim | H04N 5/208 | 348/555 |
| 7,502,073 B2 * | 3/2009 | Umesako | H04N 5/4401 | 348/441 |
| 7,876,383 B2 * | 1/2011 | Seo | H04N 5/44 | 348/555 |
| 7,924,348 B2 * | 4/2011 | Goldblatt | H04B 1/18 | 348/725 |
| 7,940,336 B2 * | 5/2011 | Takatori | H04N 5/4401 | 348/725 |
| 7,944,510 B2 * | 5/2011 | Lee | H04N 5/91 | 348/556 |
| 8,264,608 B2 * | 9/2012 | Nakamura | H04N 5/46 | 348/555 |
| 8,587,729 B2 * | 11/2013 | Yoshida | H04B 1/18 | 348/607 |
| 8,675,138 B2 * | 3/2014 | Arora | H04N 5/268 | 348/555 |
| 8,804,846 B2 * | 8/2014 | Choi | H04N 5/455 | 348/439.1 |
| 8,869,213 B2 | 10/2014 | Imai et al. | | |
| 9,036,091 B2 * | 5/2015 | Hendrickson | H04N 5/46 | 348/725 |
| 9,367,890 B2 * | 6/2016 | Choi | H04N 5/44 | |
| 2002/0085126 A1 * | 7/2002 | Matsumoto | H04N 5/4401 | 348/726 |
| 2003/0132455 A1 * | 7/2003 | Utsunomiya | H03D 7/161 | 257/200 |
| 2003/0227574 A1 * | 12/2003 | Englmeier | H03J 1/0083 | 348/731 |
| 2004/0169775 A1 * | 9/2004 | Yamamoto | H05K 9/006 | 348/836 |
| 2005/0009481 A1 * | 1/2005 | Bushner | H04N 21/42684 | 455/132 |
| 2005/0070235 A1 * | 3/2005 | Matsuura | H03J 5/244 | 455/131 |
| 2005/0116774 A1 * | 6/2005 | Fanous | H03F 3/45183 | 330/124 R |
| 2005/0195335 A1 * | 9/2005 | Gomez | H04N 5/46 | 348/707 |
| 2006/0026657 A1 * | 2/2006 | Kuhlmann | H04N 21/41 | 725/100 |
| 2006/0198116 A1 * | 9/2006 | Matsuura | H05K 3/3405 | 361/816 |
| 2007/0103602 A1 * | 5/2007 | Ikeda | H04N 5/4401 | 348/729 |
| 2007/0118859 A1 * | 5/2007 | Tsukahara | H04H 40/90 | 725/68 |
| 2007/0121010 A1 * | 5/2007 | Sasaki | H04N 5/4401 | 348/558 |
| 2007/0149111 A1 | 6/2007 | Nguyen et al. | | |
| 2007/0176275 A1 * | 8/2007 | Singleton | H01L 25/0657 | 257/686 |
| 2007/0222897 A1 * | 9/2007 | Jitsuhara | H04N 5/4401 | 348/729 |
| 2008/0106644 A1 * | 5/2008 | Matsubayashi | H04N 5/4401 | 348/555 |
| 2008/0106651 A1 * | 5/2008 | Goyal | H04N 5/44 | 348/726 |
| 2008/0138575 A1 * | 6/2008 | Yang | H01L 23/13 | 428/137 |
| 2008/0198269 A1 * | 8/2008 | Gomez | H03J 5/12 | 348/707 |
| 2009/0055870 A1 * | 2/2009 | Horibe | H04N 5/4401 | 725/46 |
| 2010/0045874 A1 * | 2/2010 | Hafemeister | H04N 5/4401 | 348/729 |
| 2010/0270667 A1 * | 10/2010 | Tong | H01L 23/055 | 257/682 |
| 2011/0124154 A1 * | 5/2011 | Yang | H01L 23/13 | 438/107 |
| 2011/0247041 A1 | 10/2011 | Imai et al. | | |
| 2012/0113324 A1 * | 5/2012 | Yoshida | H04B 1/18 | 348/555 |

FOREIGN PATENT DOCUMENTS

| | | | |
|---|---|---|---|
| CN | 102474660 A | 5/2012 | |
| EP | 2120517 | * 11/2009 | H05K 1/14 |
| JP | 2007-104031 A | 4/2007 | |
| JP | 2010-063138 A | 3/2010 | |
| JP | 2011-007718 A | 1/2011 | |
| JP | 2013-030960 A | 2/2013 | |
| WO | WO 2011/007718 A1 | 1/2011 | |

* cited by examiner

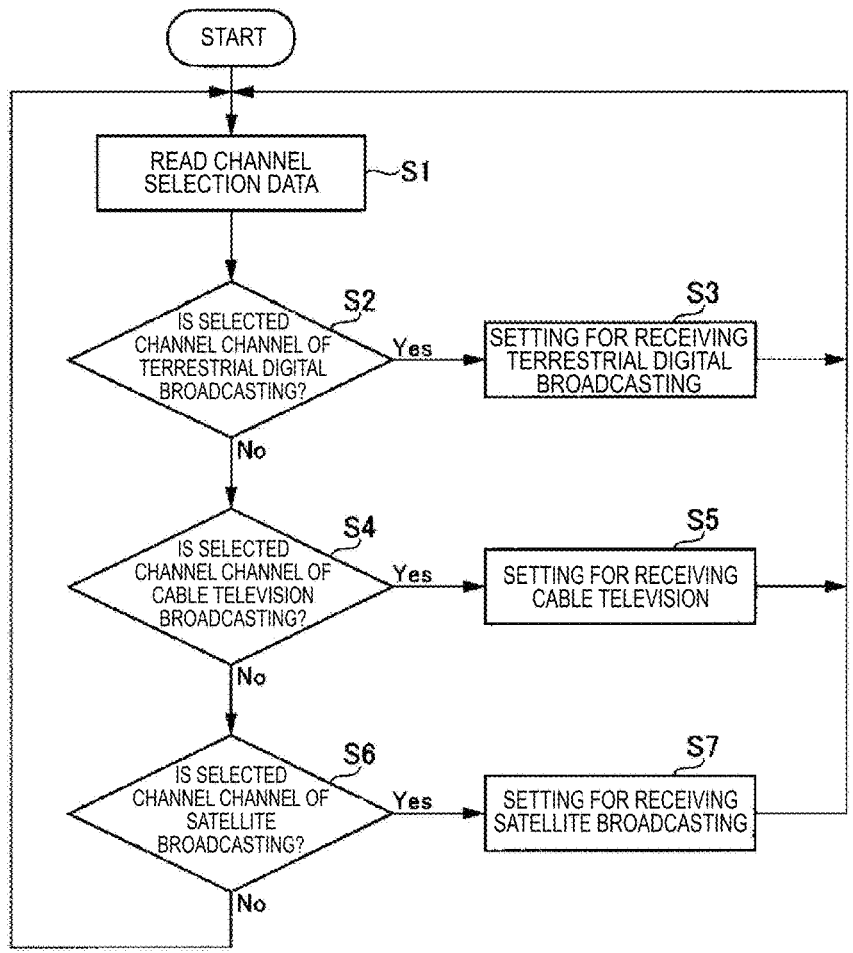

SOLID LINE: SURFACE A
DASHED LINE: SURFACE B

RECEIVER DEVICE

TECHNICAL FIELD

The present disclosure relates to a receiver device for receiving broadcast waves, and particularly to a receiver device preferable to receive a plurality of broadcast waves having different frequency bands.

BACKGROUND ART

In recent years, terrestrial analog television broadcasting, terrestrial digital television broadcasting, and satellite digital television broadcasting are performed simultaneously. Thus, these broadcast waves need to be received simultaneously, so that a plurality of broadcasts are viewed and recorded simultaneously. Hence, there is an increasing demand of a hybrid tuner module (receiver device) including a plurality of television tuners mounted in one housing for receiving these broadcast waves. Further, as seen in high-functionality mobile phones, product housings are made smaller, thinner, and less costly. Along with it, there is an ever-increasing request for supply of low-cost hybrid tuner modules, in addition to smaller and thinner hybrid modules.

In the past, when designing a hybrid tuner module in which a plurality of television tuners are mounted, the hybrid tuner module is designed using an integrated circuit (IC) in which a terrestrial wave receiving circuit is mounted and another IC in which a satellite wave reception circuit is mounted, for example (for example, refer to Patent Literature 1).

FIG. 1 is a block diagram illustrating an exemplary configuration of a receiver device of the past.

The receiver device 500 illustrated in FIG. 1 is a hybrid tuner module. The receiver device 500 includes a terrestrial-wave input terminal 501 to which a terrestrial digital broadcast signal is input, a terrestrial-wave splitter circuit 502, terrestrial-wave receiving tuners 503-1, 503-2, output terminals 504-1, 504-2, and a terrestrial-wave output terminal 505, for example. Further, the receiver device 500 includes a satellite-wave input terminal 521 to which a satellite digital broadcast signal is input, a satellite-wave splitter circuit 522, satellite-wave receiving tuners 523-1, 523-2, output terminals 524-1, 524-2, and a satellite-wave output terminal 525, for example.

The terrestrial-wave splitter circuit 502 includes a low-pass filter (LPF) 511, a low-noise amplifier (LNA) 512, and distributors 513, 514, for example. In the same way, the satellite-wave splitter circuit 522 includes a high-pass filter (HPF) 531, a low-noise amplifier (LNA) 532, and distributors 533, 534.

In the receiver device 500, a terrestrial digital broadcast signal (also simply referred to as "terrestrial broadcast signal"), which is input into the terrestrial-wave input terminal 501, is input into the terrestrial-wave splitter circuit 502. The terrestrial broadcast signal input into the terrestrial-wave splitter circuit 502 passes through the LPF 511 and the LNA 512, and thereafter is divided into two terrestrial broadcast signals by the distributor 513. One of the divided terrestrial broadcast signals is input into the distributor 514, and the other of the terrestrial broadcast signals is supplied to the terrestrial-wave output terminal 505. The terrestrial broadcast signal input into the distributor 514 is further divided by the distributor 514, and is input into the terrestrial-wave receiving tuners 503-1, 503-2. Each of the terrestrial-wave receiving tuners 503-1, 503-2 generates an intermediate frequency signal (also referred to as "IF signal") by converting the frequency of the input terrestrial broadcast signal, and outputs it to the output terminals 504-1, 504-2.

In the same way, the satellite digital broadcast signal (also simply referred to as "satellite broadcast signal"), which is input into the satellite-wave input terminal, 521 is input into the satellite-wave splitter circuit 522, and is distributed to the satellite-wave output terminal 525 and the satellite-wave receiving tuners 523-1, 523-2. The satellite-wave receiving tuners 523-1, 523-2 generate a baseband signal of I phase and Q phase by converting the frequency of the input satellite broadcast signal, and output it to the output terminals 524-1, 524-2.

CITATION LIST

Patent Literature

Patent Literature 1: WO 2011-007718

SUMMARY OF INVENTION

Technical Problem

However, when an IC in which a terrestrial broadcast reception circuit is mounted is separated from an IC in which the satellite wave reception circuit is mounted, it is unable to reduce the size and cost of the tuner module significantly. From the above situation, there has been a need for a method that further reduces the size and cost of a hybrid tuner module in which a plurality of television tuners are mounted, without deteriorating reception characteristics.

Solution to Problem

A receiver device according to an embodiment of the present disclosure includes: a first input terminal to which a first broadcast signal is input; a second input terminal to which a second broadcast signal is input; a first distribution circuit configured to distribute an input first broadcast signal to at least two or more high-frequency processing units; and a second distribution circuit configured to distribute an input second broadcast signal to at least two or more high-frequency processing units. A first high-frequency processing unit configured to execute a predetermined frequency conversion process in response to the first or second broadcast signal is included, in which the first broadcast signal is supplied from the first distribution circuit, or the second broadcast signal is supplied from the second distribution circuit. A second high-frequency processing unit configured to execute a predetermined frequency conversion process in response to the first or second broadcast signal is included, in which the first broadcast signal is supplied from the first distribution circuit, or the second broadcast signal is supplied from the second distribution circuit.

It is preferable that the above first distribution circuit and second distribution circuit be located at different layers in a same multi-layer substrate.

As above, a receiver device is configured, using a plurality of distribution circuits and a plurality of high-frequency processing units for receiving a plurality of broadcast waves having different frequency bands, without deteriorating the reception characteristics.

Advantageous Effects of Invention

According to at least one embodiment of the present disclosure, the receiver device (hybrid tuner module) in which a plurality of high-frequency processing units (tuner ICs) are mounted are further reduced in size and cost.

BRIEF DESCRIPTION OF DRAWINGS

FIG. 6 is a flowchart illustrating an example of a control by a host CPU illustrated in FIG. 3.

FIG. 7 is an explanatory diagram illustrating an example of setting performed by a host CPU illustrated in FIG. 3.

DESCRIPTION OF EMBODIMENTS

In the following, an example of a mode for carrying out the present invention (hereinafter, referred to as embodiment) will be described. In this specification and the drawings, elements that have substantially the same function and structure are denoted with the same reference signs, and repeated explanation is omitted. Description will be made in the following order.

1. First embodiment (an example in which splitter circuits are located on both superficial surfaces)
2. Second embodiment (an example in which a LPF is provided at an upstream stage of an input unit of each tuner)
3. Third embodiment (an example in which a switch unit is provided at an upstream stage of an input unit of each tuner)
4. Fourth embodiment (an example in which a switch unit and a resistive element are provided at an upstream stage of an input unit of each tuner)

<1. First Embodiment>

In the present embodiment, the size and cost of a receiver device (hybrid tuner module) is reduced by using a hybrid IC that integrates a terrestrial wave reception circuit and a satellite wave reception circuit into one unit.

[Exemplary Configuration of Receiver Device]

Figure 2:
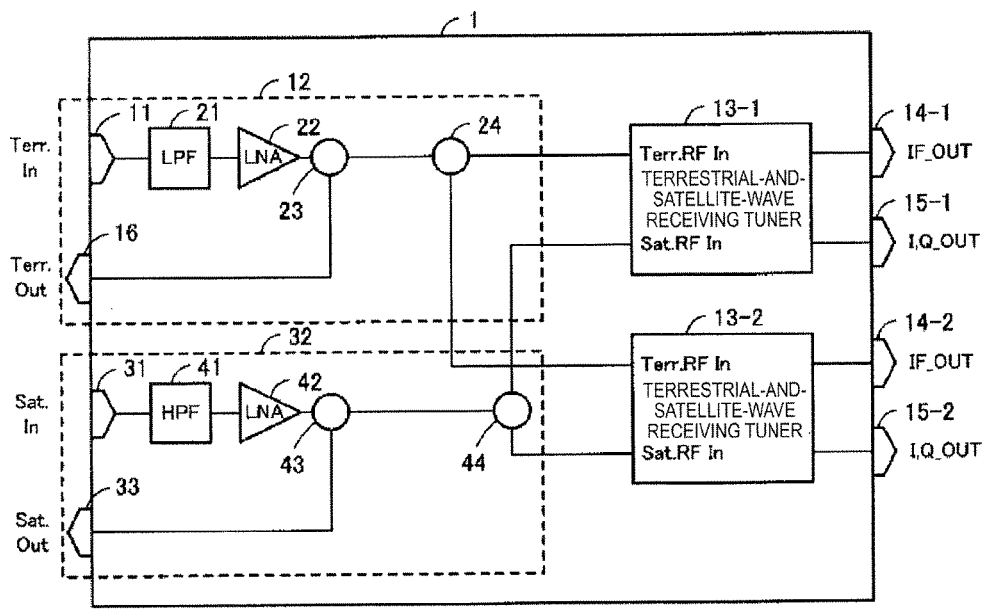
FIG. 2 is a block diagram illustrating an exemplary configuration (two tuners) of a receiver device according to a first embodiment of the present disclosure.

FIG. 2 is a block diagram illustrating an exemplary configuration (two tuners) of the receiver device according to the first embodiment of the present disclosure.

For example, the receiver device 1 according to the present embodiment includes a terrestrial-wave input terminal 11 (an example of a first input terminal) to which a terrestrial digital broadcast signal (terrestrial broadcast signal) is input, a terrestrial-wave splitter circuit 12, and a terrestrial-wave output terminal 16 (an example of a first output terminal) from which the terrestrial broadcast signal that is input into the terrestrial-wave input terminal 11 is output. Also, for example a satellite-wave input terminal 31 (an example of a second input terminal) to which a satellite digital broadcast signal (satellite broadcast signal) is input, a satellite-wave splitter circuit 32, and a satellite-wave output terminal 33 (an example of a second output terminal) from which the satellite broadcast signal that is input into the satellite-wave input terminal 31 is output are included.

Further, a first terrestrial-and-satellite-wave receiving tuner 13-1 and a second terrestrial-and-satellite-wave receiving tuner 13-2 are included. The first and second terrestrial-and-satellite-wave receiving tuners 13-1, 13-2 have a same configuration, and a terrestrial broadcast signal distributed from the terrestrial-wave splitter circuit 12 and/or a satellite broadcast signal distributed from the satellite-wave splitter circuit 32 are/is input thereto. Also, in addition, output terminals 14-1, 15-1 connected to the first terrestrial-and-satellite-wave receiving tuner 13-1, and output terminals 14-2, 15-2 connected to the second terrestrial-and-satellite-wave receiving tuner 13-2 are included.

The terrestrial-wave splitter circuit 12 (distribution circuit) includes a low-pass filter (LPF) 21 that passes the frequency band of the terrestrial broadcast signal, a low-noise amplifier 22, and distributors 23, 24, for example. In the same way, the satellite-wave splitter circuit 32 (distribution circuit) includes a high-pass filter (HPF) 41 that passes the frequency band of the satellite broadcast signal, a low-noise amplifier (LNA) 42, and distributors 43, 44.

In the receiver device 1, the terrestrial broadcast signal, which is input into the terrestrial-wave input terminal 11 from a UHF antenna (not depicted), is input into the terrestrial-wave splitter circuit 12. The terrestrial broadcast signal input into the terrestrial-wave splitter circuit 12 is divided into two terrestrial broadcast signals by the distributor 23 after passing the LPF 21 and the LNA 22. One of the divided terrestrial broadcast signals is input into the distributor 24, and the other of the terrestrial broadcast signals is supplied to the terrestrial-wave output terminal 16. Then, the terrestrial broadcast signal input into the distributor 24 is further divided by the distributor 24, and is input into the first and second terrestrial-and-satellite-wave receiving tuners 13-1, 13-2. Each of the first and second terrestrial-and-satellite-wave receiving tuners 13-1, 13-2 generates an intermediate frequency signal (IF signal) by converting the frequency of the input terrestrial broadcast signal, and outputs it to the output terminals 14-1, 14-2. The IF signal output to the output terminals 14-1, 14-2 is supplied to a demodulator.

The satellite wave system of the receiver device 1 performs the same flow as that of the above terrestrial wave system. That is, in the receiver device 1, the satellite broadcast signal input into the satellite-wave, which is input terminal 31 from an parabola antenna (not depicted), is input into the satellite-wave splitter circuit 32. The satellite broadcast signal input into the satellite-wave splitter circuit 32 is divided into two satellite broadcast signals by the distributor 43 after passing the HPF 41 and the LNA 42. One of the divided satellite broadcast signals is input into the distributor 44, and the other of the satellite broadcast signals is supplied to the satellite-wave output terminal 33. Then, the satellite broadcast signal input into the distributor 44 is further divided by the distributor 44, and is input into the first and second terrestrial-and-satellite-wave receiving tuners 13-1, 13-2. Each of the first and second terrestrial-and-satellite-wave receiving tuners 13-1, 13-2, generates a baseband signal of I phase and Q phase by converting the frequency of the input satellite broadcast signal, and outputs it to the output terminals 15-1, 15-2. The baseband signal of I phase and Q phase output to the output terminals 15-1, 15-2 is supplied to the demodulator.

For the terrestrial-and-satellite-wave receiving tuner 13-1, the configuration of the high-frequency processing unit described in the specification of Patent Application No. 2012-045657 filed by the applicant of the present application can be applied or used, for example. The above receiver device 1 is configured to generate an IF signal by converting the frequency when the terrestrial broadcast signal is input into the terrestrial-and-satellite-wave receiving tuner 13-1, and to generate a baseband signal of I phase and Q phase by converting the frequency when the satellite broadcast signal is input into the terrestrial-and-satellite-wave receiving tuner 13-1. This corresponds to the receiver device 1β of the second embodiment example described in the specification of Patent Application No. 2012-045657. According to the specification and drawings, the receiver device 1β includes a high-frequency processing unit 30s that detects a satellite IF signal by the direct conversion method, and a high-frequency processing unit 30t that detects a terrestrial radio-frequency (RF) signal (high-frequency signal) by the super heterodyne method. Then, when receiving broadcast, one of them is selected by a switch unit 200.

The receiver device 1 is not limited to the configuration in which the terrestrial-and-satellite-wave receiving tuner 13-1 generates the IF signal by converting the frequency of the terrestrial broadcast signal input. For example, it may be configured to generate a baseband signal of I phase and Q phase by converting the frequency of the terrestrial broadcast signal. This configuration corresponds to the receiver devices 1, 1α of the first embodiment example described in the specification of Patent Application No. 2012-045657. In this case, the output terminals 14-1, 14-2 for outputting the IF signal are unnecessary.

Next, an example in which the configuration that generates the baseband signal of I phase and Q phase by converting the frequency of the terrestrial broadcast signal, which is described in Patent Application No. 2012-045657, is applied to the terrestrial-and-satellite-wave receiving tuners 13-1, 13-2 will be described with reference to FIGS. 3 to 6. The terrestrial-and-satellite-wave receiving tuner 13-1 and the terrestrial-and-satellite-wave receiving tuner 13-2 have the same configuration, and thus the terrestrial-and-satellite-wave receiving tuner 13-1 will be described below.

Figure 3:
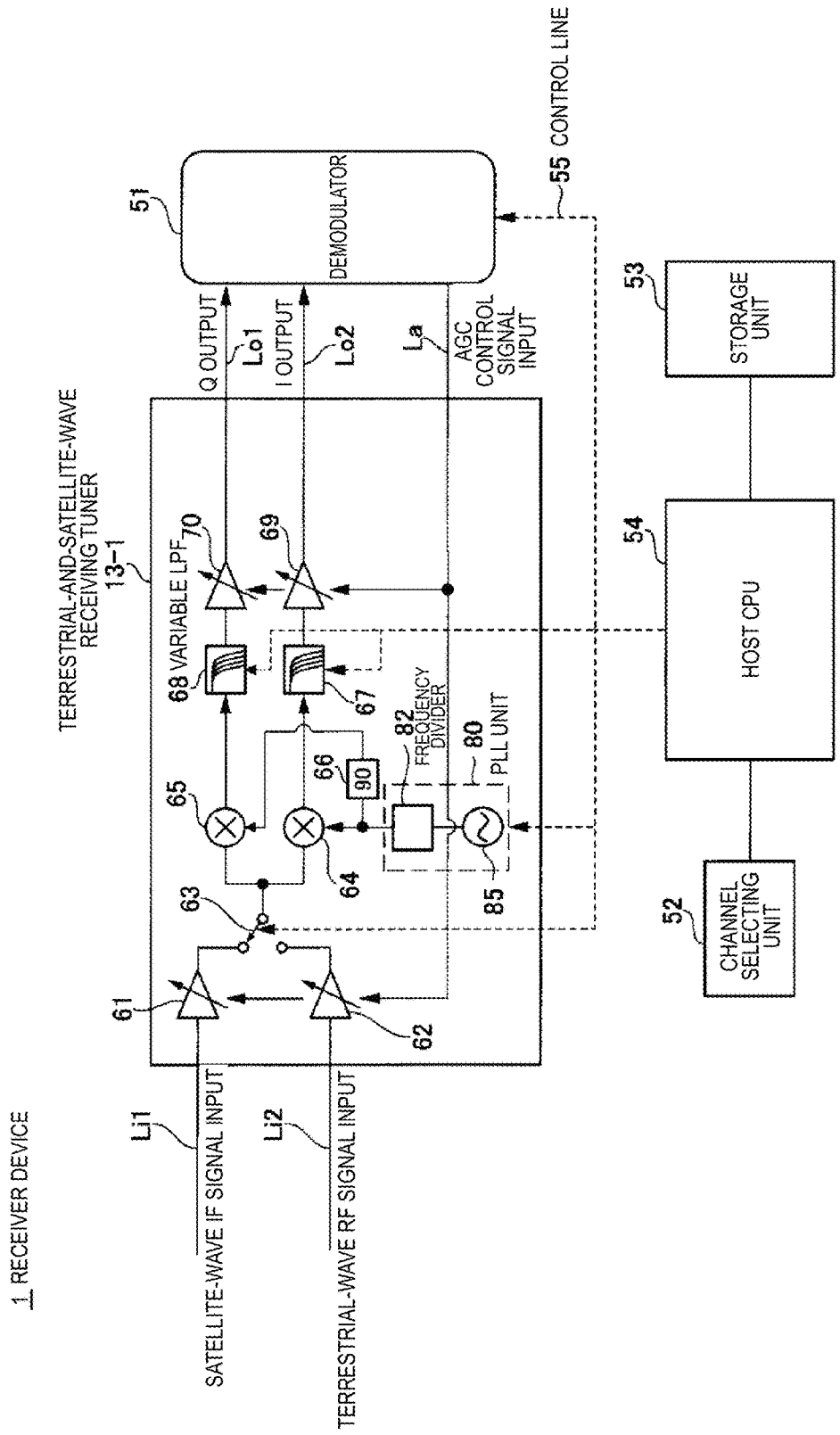
FIG. 3 is a block diagram illustrating an exemplary configuration of a terrestrial-and-satellite-wave receiving tuner in a receiver device illustrated in FIG. 2.

FIG. 3 is a block diagram illustrating an exemplary configuration of the terrestrial-and-satellite-wave receiving tuner 13-1 in the receiver device 1 illustrated in FIG. 2. The terrestrial-and-satellite-wave receiving tuner 13-1 includes the terrestrial-and-satellite-wave receiving tuner 13-1, which is a high-frequency processing unit, and a demodulator 51.

The terrestrial-and-satellite-wave receiving tuner 13-1 includes an AGC amplifier 61, an AGC amplifier 62, a switch 63 that selectively switches outputs of the AGC amplifier 61 and the AGC amplifier 62, an IQ mixer 64 as a first mixer, and an IQ mixer 65 as a second mixer. Also, a PLL unit 80 as a local oscillator, a phase shifter 66, a variable LPF 67, a variable LPF 68, a baseband amplifier 69, and a baseband amplifier 70 are included.

The satellite IF signal (satellite broadcast signal) received by the parabola antenna is input into the AGC amplifier 61 in the terrestrial-and-satellite-wave receiving tuner 13-1 through a signal line Li1. The AGC amplifier 61 amplifies and outputs the satellite IF signal input from the signal line Li1, on the basis of the AGC control signal input through a signal line La from the demodulator 51. The terrestrial RF signal (terrestrial broadcast signal) received by the UHF antenna or the RF signal of the cable television broadcasting (hereinafter, also simply referred to as "RF signal") is input into the AGC amplifier 62 in the terrestrial-and-satellite-wave receiving tuner 13-1, through a signal line Li2. The AGC amplifier 62 amplifies and outputs the RF signal input from the signal line Li2, on the basis of the AGC control signal input from the demodulator 51. As described above, the difference between the levels of both signals input into the terrestrial-and-satellite-wave receiving tuner 13-1 is covered by providing an AGC amplifier individually for each of the IF signal of the satellite broadcasting and the RF signal of the terrestrial digital broadcasting or the cable television broadcasting. Note that the AGC amplifier 61 and the AGC amplifier 62 may be configured by one amplifier using an AGC amplifier having a wide gain variable range.

The satellite IF signal amplified by the AGC amplifier 61 and the RF signal of the terrestrial digital broadcasting or the cable television broadcasting amplified by the AGC amplifier 62 are connected to the terminals of the switch 63. Then, by selectively switching the connection of the switch 63, one of the satellite IF signal and the RF signal of the terrestrial digital broadcasting or the cable television broadcasting is input into the IQ mixer 64 and the IQ mixer 65. The IQ mixer 64 mixes one of the satellite IF signal and the RF signal selected by the switch 63 with the oscillation signal (local signal) output from the PLL unit 80, and extracts the baseband signal of I phase. The IQ mixer 65 mixes one of the satellite IF signal and the RF signal selected by the switch 63 with the oscillation signal that is output from the PLL unit 80 to make its phase shifted 90° by the phase shifter 66, and extracts the baseband signal of Q phase.

Figure 4:
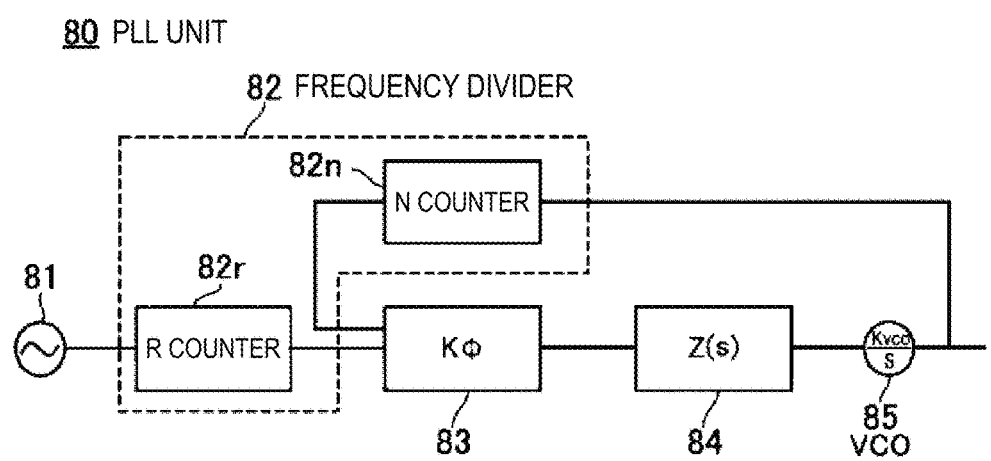
FIG. 4 is a block diagram illustrating an exemplary configuration of a PLL unit in the terrestrial-and-satellite-wave receiving tuner illustrated in FIG. 3.

The PLL unit 80 generates a local signal of the same frequency as the reception frequency that the parabola antenna or the UHF antenna is expected to receive, as the local oscillator, and supplies the generated local signal to the IQ mixer 64 and the phase shifter 66. The phase shifter 66 shifts 90° the phase of the oscillation signal input from the PLL unit 80, and inputs it into the IQ mixer 65. In the receiver device 1 of the present embodiment, a fractional-N PLL circuit that divides the frequency by a fraction is used as the PLL unit 80. FIG. 4 illustrates an exemplary configuration of the PLL unit 80 configured by the fractional-N PLL circuit. Here, fractional frequency dividing is frequency dividing including a decimal point in the frequency divided as described later.

As illustrated in FIG. 4, the PLL unit 80 includes a crystal oscillator 81 for oscillating a reference signal, a frequency divider 82, a phase comparator 83, a loop filter 84, and a VCO 85. The frequency divider 82 includes an R counter 82r and an N counter 82n. First, the reference signal oscillated by the crystal oscillator 81 is input into the R counter 82r, and is divided into R by the R counter 82r, i.e., multiplied by 1/R. The frequency divided into R by the R counter 82r is input into the phase comparator 83 as a comparison frequency.

The phase comparator 83 compares the phase of the comparison frequency input from the R counter 82r with the phase of the oscillation signal oscillated by the VCO 85 and divided by the N counter 82n, and inputs into the loop filter 84 the signal (error signal) according to the phase difference. The loop filter 84 convert the error signal input from the phase comparator 83 to a direct-current voltage and applies it to the VCO 85. The VCO 85 changes the frequency of the oscillation signal to be oscillated, according to the magnitude of the direct-current voltage applied from the loop filter 84, and supplies the oscillated oscillation signal to the N counter 82n.

In general, the oscillation frequency is set at two times or more the reception frequency of the VCO, due to the reason such as an easily obtained phase difference signal of 90°, when performing demodulation using the I and Q signals. In the receiver device 1 of the present embodiment, the broadcast wave of the satellite broadcasting transmitted using a high frequency band (950 MHz to 2150 MHz) is also to be received, and therefore the range of the output frequency of the VCO 85 is 2200 MHz to 4400 MHz.

To be operable in response to the oscillation in such a high frequency, the LC resonance circuit used in the synchronization unit of the VCO 85 according to the present embodiment is configured with a coil (synchronization inductance) inside an integrated circuit (IC). Specifically, for example, a coil is mounted in the state of a bare chip on a substrate that is made of low temperature co-fired ceramics (LTCC) or the like, and is covered by a plastic mold without wire bonding. By configuring as described above, the oscillator is configured without using bonding wire, to reduce the value of the parasitic inductance to a small value, as compared with an LC resonance circuit configured by ball grid array (BGA) for example.

The receiver device 1 according to the present embodiment receives the radio wave of the satellite broadcasting as well, and thus the oscillation frequency of the VCO 85 is very high, as described above. Then, in this case, the value of the synchronization inductance L is to be a small value, to increase the Q value of the resonance circuit. When the oscillation frequency is in a band of several GHz, the value of the synchronization inductance L is preferable to be a small value about 10 nH, for example. However, in the oscillation circuit in which the value of L is small as described above, the influence of the parasitic inductance on the resonance frequency is also large. That is, as the parasitic inductance increases, the mismatch of the resonance frequency and the parasitic oscillation are more likely to occur.

In the receiver device 1 of the present embodiment, the LC resonance circuit part of the VCO 85 is configured with a coil inside the IC, and thus the parasitic inductance is reduced to a small value to the extent that its influence is disregarded. Thereby, the mismatch of the resonance frequency and the parasitic oscillation are less likely to occur, to stabilize the oscillation behavior of the VCO 85. Further, by configuring the IC with a coil inside, the number of components of the circuit is reduced. Also, as a configuration for building a coil inside the IC, the pattern of the conductive part on the silicon chip may be wound to configure a spiral coil. By configuring as described above, the parasitic inductance is reduced to a lower value.

Note that, by building the coil for oscillation inside the IC, the Q value is low as compared with a case using an air core coil as the synchronization inductance L of the resonance circuit, for example. However, the phase noise in the loop band is reduced by increasing the comparison frequency. Moreover, as described above, the PLL unit 80 is configured by the fractional-N PLL circuit, so that the comparison frequency is increased while maintaining the minimum step frequency at a small value. That is, not only the required characteristics of the tuner required when receiving the satellite broadcasting, but also the required characteristics required when receiving when receiving the terrestrial digital broadcasting and the cable television broadcasting is satisfied.

Returning to FIG. 4 to continue the description, the N counter 82n includes an undepicted variable frequency divider and an accumulator. The variable frequency divider is composed of an N frequency divider that divides the frequency of the oscillation signal input from the voltage-controlled oscillator (VCO) 85 into N, and an N+1 frequency divider that divides the same into N+1. The accumulator selects the N+1 frequency divider K times, and selects the N frequency divider F−K times, among F times of output pulses (count value) from the variable frequency divider. By configuring as described above, (N+K/F) is obtained equivalently as an average frequency division number.

For example, a case in which N is 900 MHz, F is 5, and K is 1 is assumed. When F is within a range of 1 to 4, the N frequency divider is selected, and thus the output frequency from the N counter 82n is 900 MHz. Then, when F becomes 5, the N+1 counter is selected, and thus the output frequency from the N counter 82n is 901 MHz (=900 MHz+100 kHz). That is, the output frequency of the PLL unit 80 can be changed, with the step width (fractional frequency division ratio) of (N+K/F)=(900+⅕)=900.2 MHz. That is, the minimum step frequency of the PLL unit 80 is made smaller. Note that the values set in N, F, and K are just an example, and is not limited to this example.

In the present embodiment, the frequency division ratio of the frequency divider 82 composed of the R counter 82r and the N counter 82n is switched between 2 and 64. By configuring as described above, the frequency range within which the PLL unit 80 oscillates is set to a wide range of 34.375 MHz (2200 MHz/64 frequency division) to 2200 MHz (4400 MHz/2 frequency division). Thereby, the PLL unit 80 generates not only the frequency band of the satellite IF signal, but also the frequency for receiving VHF band and UHF band which are the frequency bands of the terrestrial digital broadcasting or the cable television broadcasting.

Returning to FIG. 3 to continue the description, the oscillation signal (local signal) output from the PLL unit 80 is mixed with the satellite IF signal or the RF signal by the IQ mixer 64 and the IQ mixer 65, and is converted to baseband signals of I phase and Q phase. Then, the baseband signals of I phase and Q phase are input into the variable LPF 67 and the variable LPF 68, respectively. The variable LPF 67 limits the frequency of the baseband signal of I phase to a predetermined band, and outputs it to the baseband amplifier 69. Also, the variable LPF 68 limits the frequency of the baseband signal of Q phase to a predetermined band and outputs it to the baseband amplifier 70.

The variable LPF 67 and the variable LPF 68 is configured as a programmable variable LPF. That is, the cutoff frequency is set as a set value in an undepicted register. In the present embodiment, the setting range is 3 MHz to 20 MHz. By setting as described above, the broadcast wave of the terrestrial digital broadcasting or the cable television broadcasting in which the occupied band width is 6 MHz to 8 MHz, as well as the broadcast wave of the satellite broadcasting in which the occupied band width is 20 MHz to 40 MHz, is obtained by passing through the variable LPF 67 and the variable LPF 68.

The baseband signal of I phase that has passed the variable LPF 67 is input into the demodulator 51 through a signal line Lo2, after the gain is adjusted by the baseband amplifier 69. Also, the baseband signal of Q phase that has passed the variable LPF 68 is input into the demodulator 51 through a signal line Lo1, after the gain is adjusted by the baseband amplifier 70. The baseband amplifier 69 and the baseband amplifier 70 of the gains is adjusted on the basis of the AGC control signal input from the demodulator 51 through a signal line La.

Figure 1:
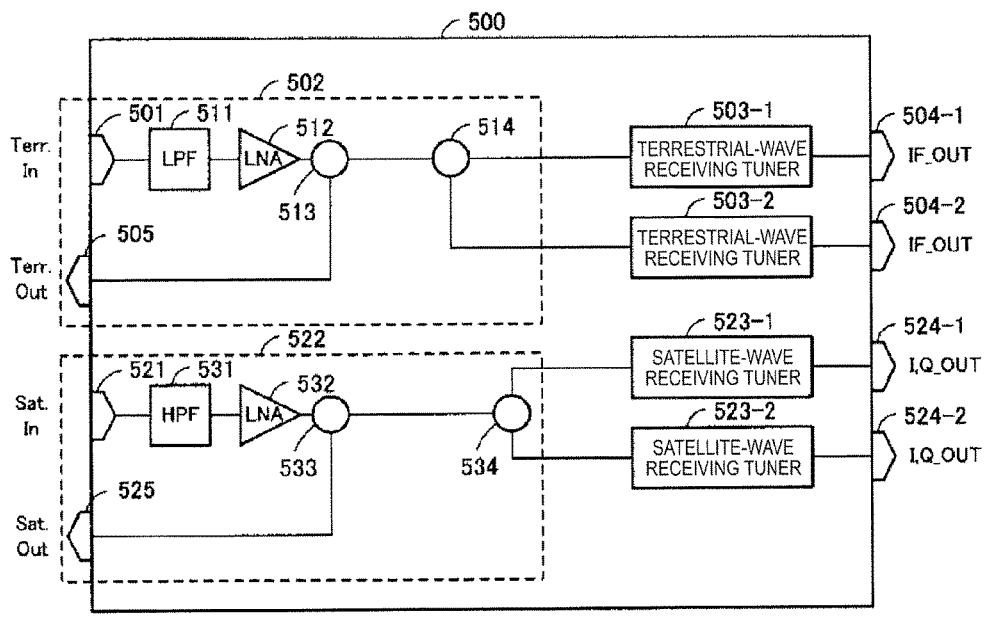
FIG. 1 is a block diagram illustrating an exemplary configuration of a receiver device of the past.
Figure 5:
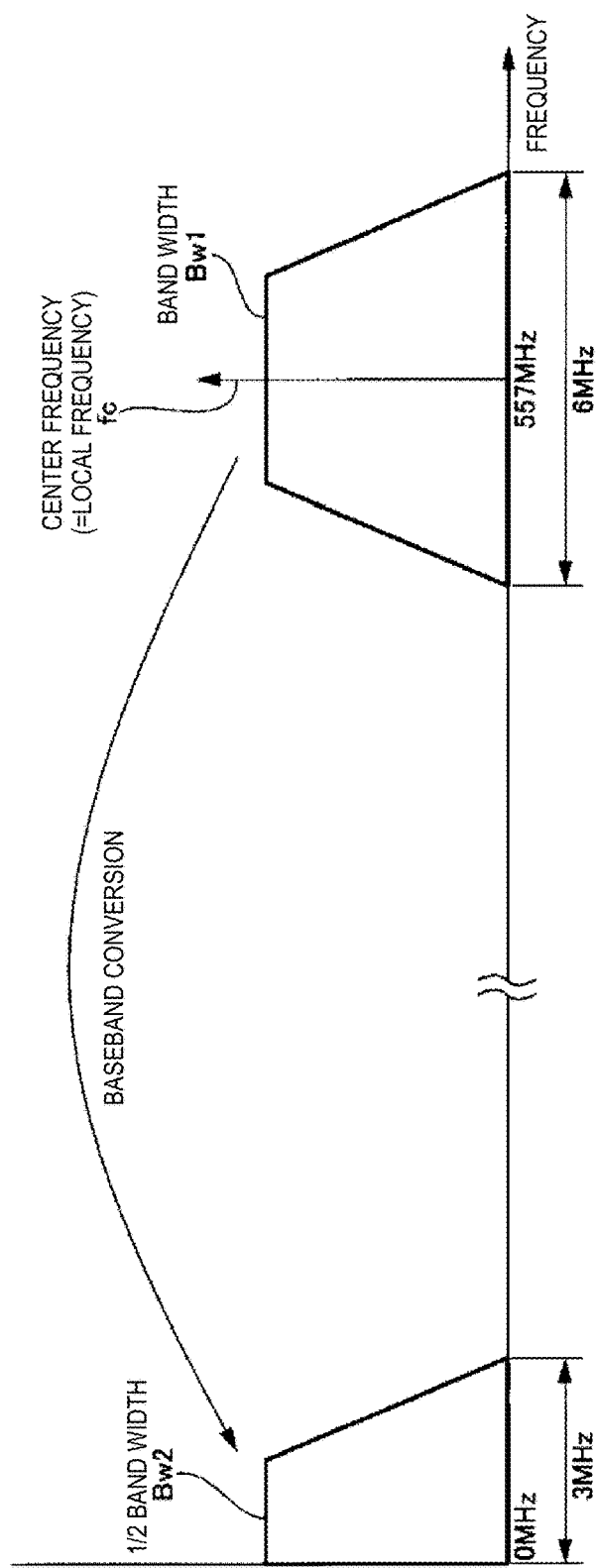
FIG. 5 is an explanatory diagram illustrating an example of a baseband conversion process in the terrestrial-and-satellite-wave receiving tuner illustrated in FIG. 3.

FIG. 5 is a diagram illustrating extraction of the baseband signal by the IQ mixers 64 and 65 (baseband conversion), and the image of the band limitation by the variable LPF 67 and the variable LPF 68. The horizontal axis of FIG. 5 indicates the frequency (MHz), and the vertical axis indicates the signal level. FIG. 5 illustrates an example that detects TS signals of 557 MHz set as the reception frequency, among the RF signals received by the UHF antenna. In this case, in the PLL unit 80 (refer to FIG. 3), the local signal of the same frequency as the reception frequency, i.e. 557 MHz is generated. Then, the IQ mixer 64 and the IQ mixer 65 multiply the local signal by the RF signal amplified by the AGC amplifier 62 (refer to FIG. 1).

Thereby, as illustrated in FIG. 5, a signal having a center frequency fc of 557 MHz that is same as the frequency (local frequency) of the local signal and a band width Bw1 of 6 MHz is extracted to be subjected to baseband conversion. That is, the RF signal received by the UHF antenna and amplified by the AGC amplifier 62 is converted to a baseband signal having a center frequency fc of 0 MHz. Further, the baseband signal extracted in this way passes the variable LPF 67 and the variable LPF 68, to limit its band width Bw2 to a half width. That is, in the receiver device 1 of the present embodiment, the detection is performed by the direct conversion method.

Again, FIG. 3 is referred to continue the description. The demodulator 51 demodulates each of the input baseband signals of I phase and Q phase by a predetermined demodulation method, and outputs it as a transport stream (TS) signal. In the present embodiment, the demodulator 51 is configured such that demodulation is performable by the demodulation method corresponding to each of the broadcast standards of the terrestrial digital broadcasting, the cable television broadcasting, and the satellite broadcasting. That is, the signal demodulation is performed by the demodulation method corresponding to the modulation method employed in ISDB-T which is the broadcasting format of the terrestrial digital broadcasting, the modulation method used in the cable television broadcasting, and the modulation method employed in ISDB-S which is the broadcasting format of the satellite broadcasting. The TS signal demodulated by the demodulator 51 is decoded by an undepicted MPEG (Moving Picture Experts Group) decoder, to extract video signals and audio signals.

Also, the receiver device 1 includes a channel selecting unit 52, a storage unit 53, and a host CPU 54 as a control unit. The channel selecting unit 52 is configured by a remote controller or the like, and transmits the information of a channel selected by a user to the host CPU (Central Processing Unit) 54 as channel selection data. The storage unit 53 is composed of a non-volatile memory and the like, to store the channel selection data and its corresponding setting data. Note that the generation of the channel selection data is not performed only when the channel is selected via the channel selecting unit 52 configured as the remote controller. For example, the channel selection data is generated, when a specific program is selected via an electronic program guide (EPG), and when a specific program is selected for timer recording.

The host CPU 54 controls each unit of the receiver device 1, particularly, reads the setting data necessary for receiving broadcast of the selected channel from the storage unit 53, on the basis of the channel selection data, and sets each unit of the receiver device 1 on the basis of the read setting data.

FIG. 6 illustrates a flowchart of an example of control by the host CPU 54. First, the host CPU 54 reads the channel selection data transmitted from the channel selecting unit 52 or the channel selection data generated on the basis of the channel selection performed using the EPG and the timer recording (step S1). Then, it is determined whether or not the selected channel is the channel of the terrestrial digital broadcasting (step S2). If the channel of the terrestrial digital broadcasting, the setting for receiving the terrestrial digital broadcasting is conducted on each unit of the receiver device 1 (step S3), and the process returns to step S1. If it is determined that the selected channel is not the channel of the terrestrial digital broadcasting in step S2, it is thereafter determined whether or not the selected channel is the channel of the cable television broadcasting (step S4). If it is determined to be the channel of the cable television broadcasting, the setting for receiving the cable television broadcasting is conducted on each unit of the receiver device 1 (step S5), and the process returns to step S1.

If it is determined that the selected channel is not the channel of the cable television broadcasting in step S4, it is thereafter determined whether or not the selected channel is the channel of the satellite broadcasting (step S6). If it is determined to be the channel of the satellite broadcasting, the setting for receiving satellite broadcasting is conducted on each unit of the receiver device 1 (step S7), and the process returns to step S1. Also, if the selected channel does not correspond to any broadcasting described above, the process returns to step S1.

FIG. 7 illustrates an example of setting performed by the host CPU 54. The setting items are, for example, "connection destination of switch", "output frequency of VCO", "frequency division ratio of frequency divider", "cutoff frequency of variable LPF", "broadcast standard (demodulation method) of demodulator". First, the setting performed by the host CPU 54 when the channel of the terrestrial digital broadcasting is selected will be described. When the channel of the terrestrial digital broadcasting is selected, the connection destination of the switch 63 (refer to FIG. 3) is switched to the AGC amplifier 62. Thereby, the RF signal received by the UHF antenna via the switch 63 and amplified by the AGC amplifier 62 is input into the IQ mixer 64 and the IQ mixer 65.

The output frequency of the VCO 85 of the PLL unit 80 is set at an appropriate frequency within the range of 2200 MHz to 4400 MHz. That is, the frequency according to the reception frequency set by the selected channel is oscillated as the output frequency from within the range of 2200 MHz to 4400 MHz. The frequency division ratio of the frequency divider 82 is set at an appropriate value between of 4 and 64. The output frequency of the VCO 85 and the frequency division ratio of the frequency divider 82 is set as described above, so that the local frequency of 44 MHz to 870 MHz is oscillated from the PLL unit 80. That is, the same frequency as the frequency used in the broadcast wave transmission of the terrestrial digital broadcasting is oscillated.

Also, the cutoff frequencies of the variable LPF 67 and the variable LPF 68 are each set at an appropriate value between 3 MHz and 4 MHz. Thereby, only the frequency of 6 MHz to 8 MHz which is the band width of one channel of the terrestrial digital broadcasting is passed, by the variable LPF 67 and the variable LPF 68. The corresponding broadcast method of the demodulator is switched to the ISDB-T method, and the OFDM method and the 8VSB method are set as the demodulation method.

When the channel of the cable broadcasting is selected, the setting is almost same as when the channel of the terrestrial digital broadcasting is selected. What is different is the demodulation method in the demodulator 51. When receiving the cable broadcasting, the demodulation method according to the modulation method for transmission of the cable television broadcasting, that is, a demodulation method, such as 64QAM, 128QAM, and 256QAM, is selected.

When the channel of the satellite broadcasting is selected, the connection destination of the switch 63 (refer to FIG. 3) is switched to the AGC amplifier 61 by the host CPU 54. Thereby, the satellite IF signal received by the parabola antenna and amplified by the AGC amplifier 61 is input into the IQ mixer 64 and the IQ mixer 65 via the switch 63.

The output frequency of the VCO 85 of the PLL unit 80 is set at an appropriate frequency within the range of 2200 MHz to 4400 MHz. That is, the frequency according to the reception frequency set by the selected channel is oscillated as the output frequency from within the range of 2200 MHz to 4400 MHz. The frequency division ratio of the frequency divider 82 is set at an appropriate value between 2 and 4. The output frequency of the VCO 85 and the frequency division ratio of the frequency divider 82 is set as described above, so that the local frequency of 950 MHz to 2150 MHz is oscillated from the PLL unit 80. That is, the same frequency as the frequency used in the broadcast wave transmission of the satellite broadcasting is oscillated.

Also, the cutoff frequencies of the variable LPF 67 and the variable LPF 68 are each set at an appropriate value between 10 MHz to 20 MHz. Thereby, only the frequency of 20 MHz to 40 MHz which is the band width of one channel of the satellite broadcasting is passed, by the variable LPF 67 and the variable LPF 68. The corresponding broadcast method of the demodulator is switched to the ISDB-S method, and the QPSK method and the 8PSK method are set as the demodulation method.

As above, according to the receiver device 1 of the present embodiment, the setting of each unit of the terrestrial-and-satellite-wave receiving tuner 13-1 (refer to FIG. 3) and the setting of the demodulator 51 are switched according to the channel selection data, by the control of the host CPU 54. Thereby, a plurality of broadcast waves of different broadcast methods, such as the terrestrial digital broadcasting and the satellite broadcasting is received, by one terrestrial-and-satellite-wave receiving tuner 13-1 and the demodulator 51. Thus, the scale of the circuits configuring the terrestrial-and-satellite-wave receiving tuners 13-1, 13-2 and the demodulator 51 is reduced to a large degree, and thus the mount area of the circuits is also reduced. Thereby, the reduction in size of the receiver device 1 and the reduction of the manufacture cost are achieved.

Also, according to the receiver device 1 of the present embodiment, the broadcast wave of the terrestrial digital broadcasting and the broadcast wave of the cable television broadcasting are also demodulated by the direct conversion method. That is, the reception signal is needless to be converted to the IF signal as in detection of waves in the super heterodyne method, and thus the simplification of the circuit configuration and the reduction in size of the circuit are achieved.

Also, in the receiver device 1 of the present embodiment, the PLL unit 80 is configured by a fractional-N PLL circuit. Thereby, the minimum step frequency of the PLL unit 80 (frequency divider 82) can be made smaller. That is, the frequency of the local signal is switched by a small step width, and therefore a small minimum step frequency such as 125 kHz to 166.7 kHz required when receiving the terrestrial digital broadcasting and receiving the cable television broadcasting is also settable.

Also, by configuring the PLL unit 80 by the fractional-N PLL circuit, the frequency division number of (N+K/F) is settable, to increase the comparison frequency up to F times the normal PLL. For example, when F is 5, the comparison frequency is increased up to five times. Then, by increasing the comparison frequency, the loop gain around the center frequency of the VCO 85, for example the offset point by 1 kHz, becomes high. Thereby, the phase noise in the loop band is reduced. Thus, the performance of the phase noise of 1 kHz or less required for the receiver device for the terrestrial digital broadcasting and the cable television broadcasting is also satisfied.

Also, in the receiver device 1 of the present embodiment, the LPFs that limit the band of the baseband signals of I phase or Q phase generated by the IQ mixers 64 and 65 are configured as a variable LPF. Thereby, the broadcast wave of an intended channel is received without an error, in the area in which a plurality of broadcast waves of a same channel are transmitted using carrier waves of different frequencies from different radio-wave towers built in different areas.

Also, although most MPEG decoders used to receive the digital broadcasting have two TS signal processing systems in the past, it is envisaged that they increase in number up to 4 systems or 8 systems in future. The digital modulation and demodulation technology used in the modulation and demodulation of the digital broadcast is characterized in resistance to interference between data mutually, and therefore is considered to accommodate the increase of the process systems theoretically. In this case as well, in the receiver device 1 of the present embodiment, the terrestrial-and-satellite-wave receiving tuner 13-1 (tuner unit) is needless to be provided in the same number as the number of the TS signal processing systems. Thus, problem such as shortage of the circuit location space is prevented in the actual circuit design.

Also, in the receiver device configured to receive a plurality of types of broadcast waves, it is important to distribute the input signal from the antenna, in the high-frequency processing unit (tuner unit) at an appropriate proportion. Then, to achieve the distribution of appropriate proportion, it is effective to configure the high-frequency processing units that handle different broadcast waves by a same circuit, and to make the locations of the high-frequency processing units to be symmetric with respect to a midpoint at a point where the satellite IF signal or the RF signal obtained by the antenna is input. According to the receiver device 1 of the present embodiment, the number of the high-frequency processing units is reduced as compared with the past, to achieve this circuit configuration comparatively easily. Thus, the increase of the TS signal processing systems in the decoder is accommodated easily.

In addition, the use of the receiver device (hybrid tuner) of the present embodiment facilitates the design of the hybrid module that matches the request of a customer in which one set, two set, three set, • • • of the terrestrial wave receiving circuit and the satellite wave reception circuit exist. The circuit around the IC and the configuration on the circuit substrate are designed in a duplicative manner, so that the standardization of the development is achieved. Thereby, the development cost of the module is reduced.

Figure 8:
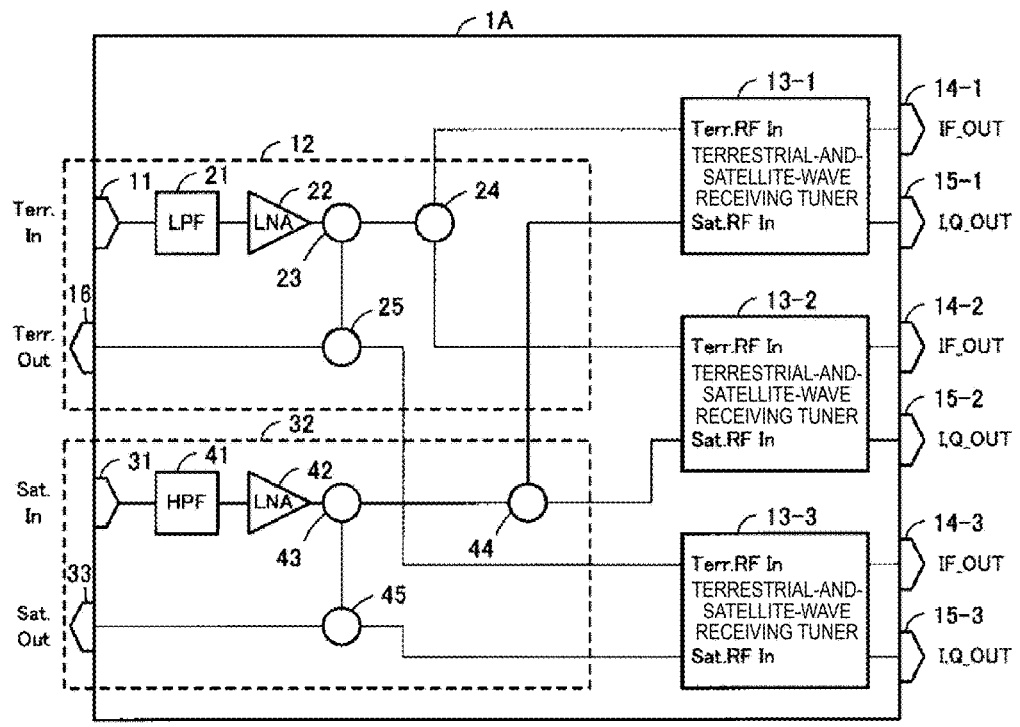
FIG. 8 is a block diagram illustrating another exemplary configuration (three tuners) of a receiver device according to a first embodiment of the present disclosure.

FIG. 8 is a block diagram illustrating another exemplary configuration (three tuners) of the receiver device according to the first embodiment of the present disclosure. In FIG. 8, parts corresponding to FIG. 2 are denoted with the same reference signs, and their detailed description is omitted.

A receiver device 1A illustrated in FIG. 8 includes a terrestrial-and-satellite-wave receiving tuner 13-3, an output terminal 14-3 for outputting an IF signal, an output terminal 15-3 for outputting a baseband signal of I phase and Q phase, and a distributors 25, 45, additionally in the receiver device 1.

The distributor 25 further divides the terrestrial broadcast signal divided by the distributor 23, and inputs it into the terrestrial-and-satellite-wave receiving tuner 13-3, and supplies it to the terrestrial-wave output terminal 16. In the same way, the distributor 45 further divides the satellite broadcast signal divided by the distributor 43, and inputs it into the terrestrial-and-satellite-wave receiving tuner 13-3, and supplies it to the satellite-wave output terminal 33.

The terrestrial-and-satellite-wave receiving tuner 13-3 has the same configuration as the terrestrial-and-satellite-wave receiving tuners 13-1, 13-2. That is, the terrestrial-and-satellite-wave receiving tuner 13-3 generates an IF signal by converting the frequency when the terrestrial broadcast signal is input, and outputs it to the output terminal 14-3. Also, the baseband signal of I phase and Q phase is generated by converting the frequency when the satellite broadcast signal is input, to output it to the output terminal 15-3. Note that, as described above, the terrestrial-and-satellite-wave receiving tuner 13-3 may be configured to generate a baseband signal of I phase and Q phase by converting the frequency of the input terrestrial broadcast signal.

In the meantime, various problems occur by using an IC that integrates the terrestrial wave receiving circuit and the satellite wave reception circuit, such as the terrestrial-and-satellite-wave receiving tuners 13-1 to 3. One problem is radiation generated by signal lines of high-frequency signals of the terrestrial wave and the satellite wave which are adjacent to each other or cross each other.

In the case of the tuner IC of the past in which the terrestrial wave receiving circuit and the satellite wave reception circuit are mounted separately, the terrestrial wave system of the splitter circuit and the tuner IC for the terrestrial wave and the satellite wave system of the splitter circuit and the tuner IC for the satellite wave are located apart from each other.

For example, in the receiver device 500 (FIG. 1), the terrestrial-wave receiving tuners 503-1, 503-2 and the satellite-wave receiving tuners 523-1, 523-2 are located apart from each other. Hence, the terrestrial-wave splitter circuit 502 configured by the LPF 511, the LNA 512 and the distributors 513, 514, and the satellite-wave splitter circuit 522 configured by the HPF 531, the LNA 532 and the distributors 533, 534 are located independently without crossing. Thus, the receiver device of the past is less likely to be affected by the interference by the signal and its distortion component generated from the amplifier of the reception circuit of the broadcast wave, when sending a signal to a plurality of tuner ICs via each splitter circuit from one terrestrial-wave input terminal and one satellite-wave input terminal.

However, in recent years, tuner ICs that integrate a terrestrial wave receiving circuit and a satellite wave reception circuit have developed. Hence, in the case of the receiver device that mounts a plurality of tuner ICs for the terrestrial wave and for the satellite wave, the signal lines of the terrestrial wave system and the satellite wave system are more likely to be adjacent to each other or cross each other. Therefore, there is an influence of the interference by the signals amplified by the amplifiers of the reception circuits of the terrestrial wave system and the satellite wave system and the generated distortion component.

For example, in the receiver device 1A (FIG. 8), the broadcast signals of the terrestrial wave and the satellite wave are input into the terrestrial-and-satellite-wave receiving tuners 13-1, 13-2. Hence, the signal lines of the terrestrial-wave splitter circuit 12 configured by the LPF 21, the LNA 22 and the distributors 23, 24, 25, and the satellite-wave splitter circuit 32 configured by the HPF 41, the LNA 42 and the distributors 43, 44, 45 cross each other and are connected to each tuner.

[Interference by RF Signal]

As one example of the interfering wave, when the terrestrial wave is in a weak electric field environment, and the satellite wave is in an intense electric field environment, second-order distortion and the third-order distortion are generated at the low-noise amplifier of the satellite wave reception circuit, as described below. Also, not only satellite multiple waves, but also one satellite wave generates interfering waves, depending on the VCO of the tuner. The interfering wave generated by the below mechanism leaks into the route of the terrestrial broadcast signal to cause an interference.

In the case of the satellite wave intense electric field environment
Satellite wave RF signal 1: 1318 MHz
Satellite wave RF signal 2: 1893 MHz
Second-order distortion component: 1893−1318=575 MHz (terrestrial wave 30ch)
Satellite wave RF signal 1: 1240 MHz
Satellite wave RF signal 2: 1905 MHz
Third-order distortion component: 1240*2−1905=575 MHz (terrestrial wave 30ch)
Satellite wave RF signal: 1240 MHz
VCO component: 1815 MHz
One-wave interference: 1815−1240=575 MHz (terrestrial wave 30ch)

As opposed to the above, when the satellite wave is in the weak electric field environment, and the terrestrial wave is in the intense electric field environment, the second-order distortion and the third-order distortion are generated at the low-noise amplifier of the terrestrial wave receiving circuit, as described below. The interfering wave generated by the below mechanism leaks into the route of the satellite broadcast signal to cause an interference.

In the case of the terrestrial wave intense electric field environment
Terrestrial RF signal 1: 617 MHz
Terrestrial RF signal 2: 701 MHz
Second-order distortion component: 617+701=1318 MHz (BS 15ch)
Terrestrial RF signal 1: 362 MHz
Terrestrial RF signal 2: 594 MHz
Third-order distortion component: 362*2+594=1318 MHz (BS 15ch)

[Interference by VCO]
The VCO-originated oscillation is a cause (interference to the terrestrial wave)
The oscillation frequency of the VCO in the tuner A: 3546 MHz (ND 10ch)
The oscillation frequency of the VCO in the tuner B: 4026 MHz (ND 22ch)
The second-order distortion component: 4026−3546=480 MHz (terrestrial wave 14ch)
The VCO-originated oscillation is a cause (interference to the satellite wave)
The oscillation frequency of the VCO in the tuner A: 3960 MHz (terrestrial 16 channel)
The oscillation frequency of the VCO in the tuner B: 2648 MHz (terrestrial C40 channel)
The second-order distortion component: 3960−2648=1312 MHz (BS 15ch)

To convert the received RF signal to the IF frequency or the baseband, the mixer is to be multiplied by the local frequency to convert the frequency, and the local frequency is generated by multiplying the oscillation frequency of the VCO by 1/N by the frequency divider. During this, 1/N frequency is also generated as an interference.

The VCO_½ interference
2628 MHz (terrestrial 43 channel_VCO)/2=1314 MHz (BS 15 channel)
The VCO_¼ interference
2628 MHz (terrestrial 43 channel_VCO)/4=657 MHz (terrestrial wave 44 channel)

The above divided frequency signal leaks into the frequency band of the terrestrial wave/the satellite wave, to cause an interference.

Thus, to reduce the above generated interference, the terrestrial-wave splitter circuit including the filter, the LNA, and the distributor of the receiver device, and the satellite-wave splitter circuit including the filter, the LNA, and the distributor are separately located on both superficial surfaces of the multi-layer substrate. This configuration improves the isolation characteristics between the terrestrial wave system and the satellite wave system, and reduces the interference (interference) of each of the terrestrial wave system and the satellite wave system, to achieve preferable reception characteristics.

[An Example in which the Splitter Circuits are Located on Both Superficial Surfaces]

Figure 9:
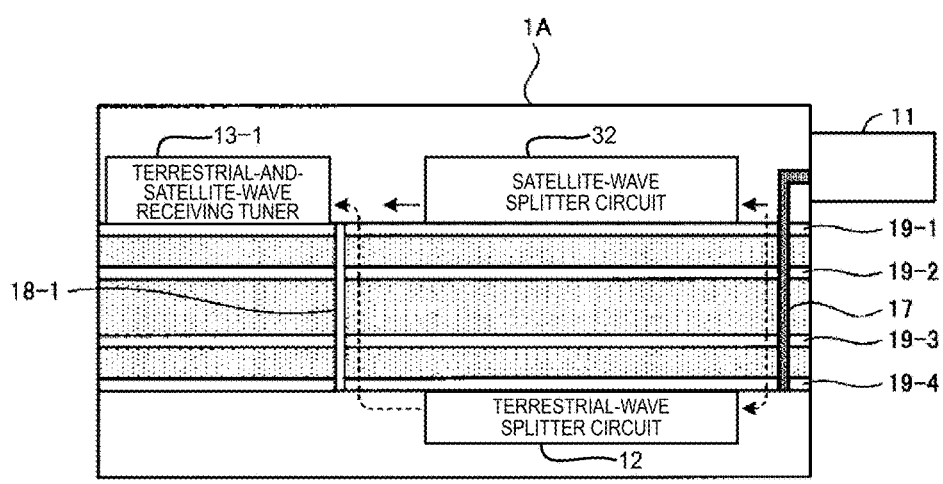
FIG. 9 is a schematic cross-sectional view illustrating an exemplary cross-sectional configuration of the receiver device illustrated in FIG. 8.
Figure 10:
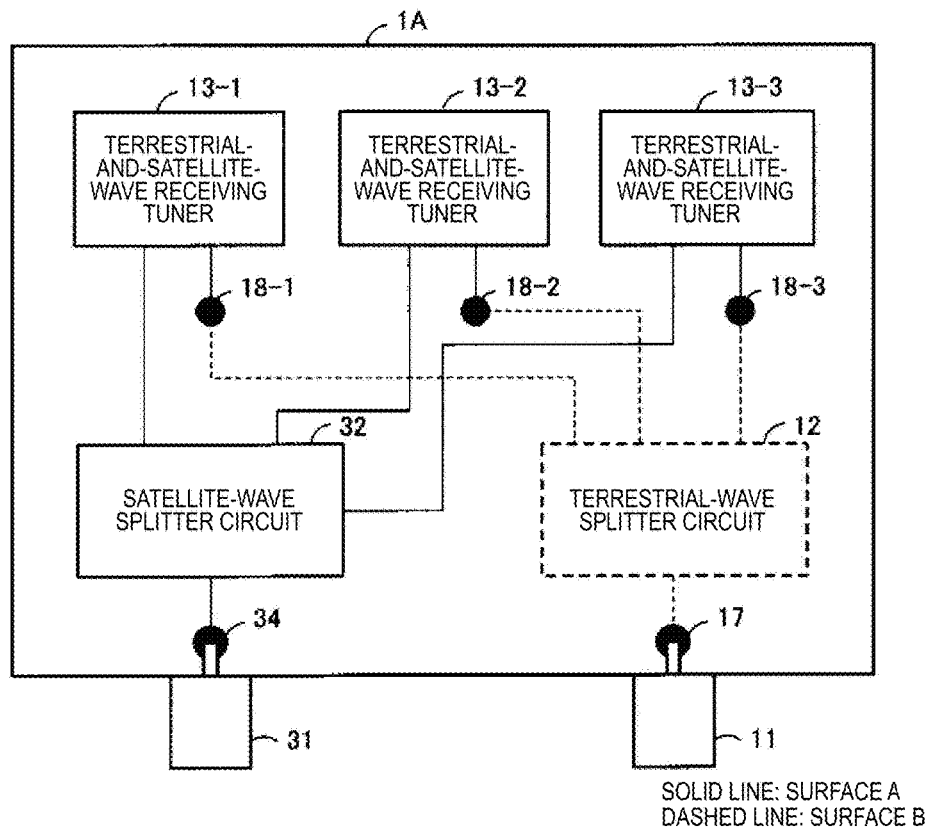
FIG. 10 is a schematic top view illustrating an exemplary top face configuration of the receiver device illustrated in FIG. 8.

FIG. 9 is a schematic cross-sectional view illustrating an exemplary cross-sectional configuration of the receiver device 1A illustrated in FIG. 8. FIG. 10 is a schematic top view illustrating an exemplary top face configuration of the receiver device illustrated in FIG. 8.

The multi-layer substrate on which the receiver device 1A of the present example is formed is configured such that four hard-wired layers 19-1 to 19-4 and insulating layers therebetween are stacked alternatingly. In the receiver device 1A, one of the RF signals of the terrestrial wave and the satellite wave input from the input terminals 11, 31 (F connectors) passes a core line 17 of the F connector to be transmitted to a B surface (under surface), and the other is transmitted to an A surface (top face).

The satellite-wave splitter circuit 32 including the LNA, the distributor is located on the A surface (first hard-wired layer 19-1), and the terrestrial-wave splitter circuit 12 including the LNA, the distributor is located on the B surface (fourth hard-wired layer 19-4). The RF signal that passes through the terrestrial-wave splitter circuit 12 of the B surface via the core line 17 from the input terminal 11 passes through vias 18-1 to 18-3, and is input into ICs of respective terrestrial-and-satellite-wave receiving tuners 13-1 to 13-3. Also, the RF signal that passes through the satellite-wave splitter circuit of the A surface from the input terminal 31 is directly input into the ICs of the terrestrial-and-satellite-wave receiving tuners 13-1 to 13-3. Although, in this example, the satellite-wave splitter circuit 32 is located on the A surface, and the terrestrial-wave splitter circuit 12 is located on the B surface, the splitter circuits of the A surface and the B surface may be located inversely.

Figure 11:
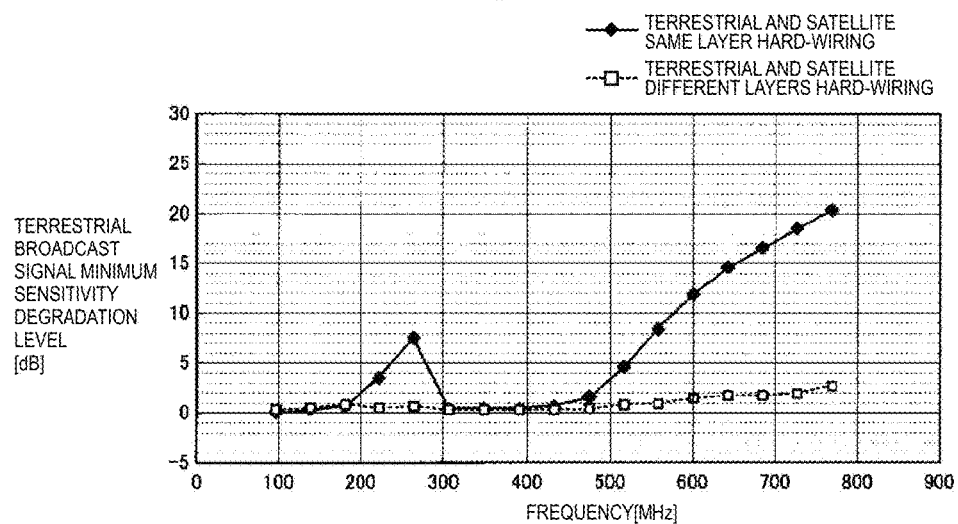
FIG. 11 is a graph illustrating an example of frequency characteristics of a terrestrial broadcast signal minimum reception sensitivity degradation level, in a tuner adjacent to a tuner that has received a satellite broadcast signal.

FIG. 11 is a graph illustrating an example of the frequency characteristics of the terrestrial broadcast signal minimum reception sensitivity degradation level [dB], in a tuner adjacent to a tuner that has received a satellite broadcast signal. Plotted points of black painted rhombus (♦) indicate a case in which the splitter circuits of the terrestrial wave and the satellite wave are located on a same layer, and plotted points of white hollow quadrangle (□) indicate a case in which the splitter circuits of the terrestrial wave and the satellite wave are located on different layers, and this is a comparison graph of the terrestrial wave minimum reception sensitivity characteristics when inputting a terrestrial wave intense electric field signal. When the splitter circuits of the terrestrial wave and the satellite wave are located on the same layer, the minimum reception sensitivity degradation level is high in the frequency band of approximately 200 to 300 MHz and approximately 550 MHz or more, as compared to a case in which they are located on different layers.

Figure 12:
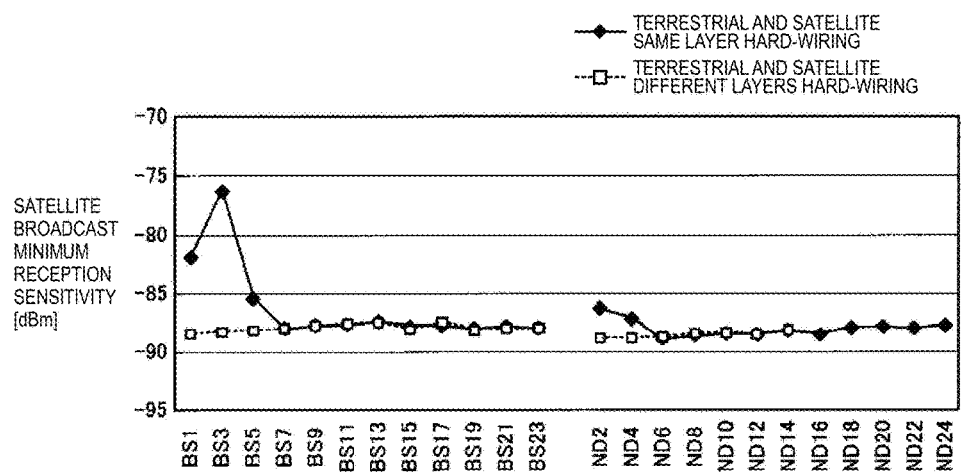
FIG. 12 is a graph illustrating an example of a relationship between a satellite broadcast signal minimum reception sensitivity and a broadcast channel, in a tuner adjacent to a tuner that has received a terrestrial broadcast signal.

FIG. 12 is a graph illustrating an example of a relationship between a satellite broadcast signal minimum reception sensitivity [dBm] and a broadcast channel, in a tuner adjacent to a tuner that has received a terrestrial broadcast signal. Plotted points of black painted rhombus (♦) indicate a case in which the splitter circuits of the terrestrial wave and the satellite wave are located on a same layer, and plotted points of white hollow quadrangle (□) indicate a case in which the splitter circuits of the terrestrial wave and the satellite wave are located on different layers, and this is a comparison graph of the satellite wave minimum reception sensitivity characteristics when inputting a satellite wave intense electric field signal. The measurement condition of this case is an input terrestrial broadcast signal of −20 dBm, QEF (quasi-error free), CN of 14 dB, and TC8PSK2/3 (48 Slot). When the splitter circuits of the terrestrial wave and the satellite wave are located on the same layer, the reception sensitivity degradation is large in the frequency band of the channel of BS 1, 3, 5 and ND 2, 4, as compared to a case in which they are located on different layers.

According to the first embodiment described above, the one receiver device (tuner module) includes a plurality of tuner ICs, and the signal lines of the terrestrial wave and the satellite wave are more likely to be adjacent to each other or cross each other, when the tuner for the reception of the terrestrial wave and the satellite wave is of the integrated type. Hence, it is more likely to be interfered by the signal amplified by the amplifier of each splitter circuit and the generated distortion component. Thus, the splitter circuit configured by the filter, the amplifier, and the distributor, from the input unit of the receiver device are located on both superficial surfaces of the multi-layer substrate, in such a manner that the terrestrial-wave splitter circuit and the satellite-wave splitter circuit are located separately, to reduce each interference, and to achieve preferable reception characteristics.

<2. Second Embodiment>

As another problem of a plurality of reception circuits that exist in one IC, there is a spurious component (interfering wave signal) generated from the voltage control oscillator (VCO) and the like. It leaks from the terrestrial-wave input terminal and the satellite-wave input terminal of the tuner IC, to cause a problem of the interference to other tuner modules and other tuners. In the receiver device (tuner module) having a plurality of tuners, as the number of the tuners is large, more spurious component by the VCO generated from each tuner exists, increasing the influence of the interfering wave, as compared to a case in which the tuners are few. This problem will be described with reference to FIG. 13.

Figure 13:
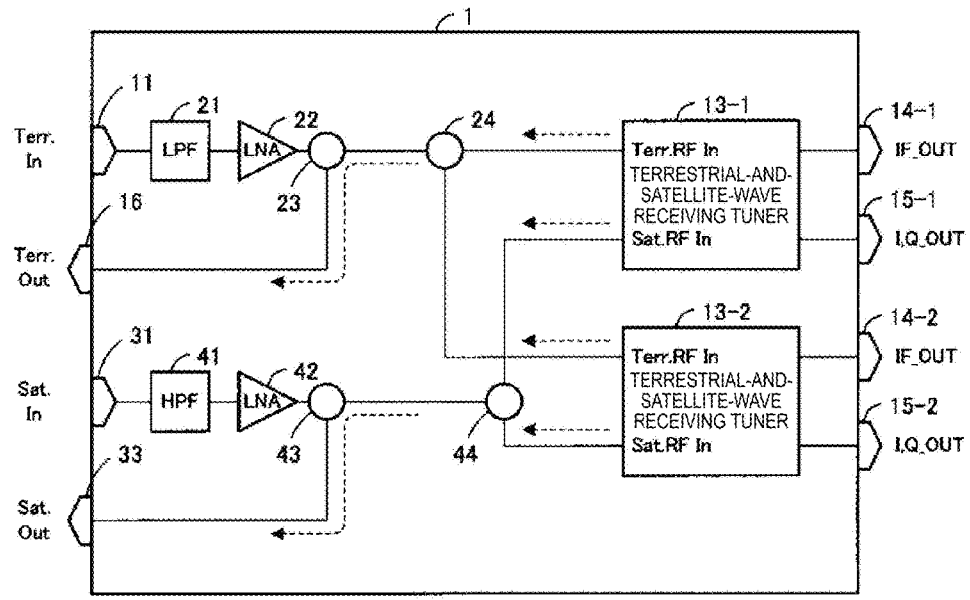
FIG. 13 is an explanatory diagram of a spurious component (an interfering wave signal) generated from a terrestrial-and-satellite-wave receiving tuner.

FIG. 13 is an explanatory diagram of the spurious component (interfering wave signal) generated from the terrestrial-and-satellite-wave receiving tuner.

The receiver device 1 includes a terrestrial-wave input terminal 11, a terrestrial-wave output terminal 16 that sends a signal to a tuner module of another housing, a satellite-wave input terminal 31, and a satellite-wave output terminal 33 that sends a signal to the tuner module of the other housing. In the receiver device 1 of this configuration, the broadcast signals input from the input terminals 11, 31 of the terrestrial wave and the satellite wave are each input into the terrestrial-and-satellite-wave receiving tuners 13-1, 13-2, via the filters, the LNAs, the distributors.

During this, in the terrestrial-and-satellite-wave receiving tuner 13-1, spurious (dashed line arrow) from the terrestrial-wave input terminal due to the built-in VCO 85, and spurious (dashed line arrow) from the satellite-wave input terminal in the same reason are generated, to be transmitted in the circuit. Also, in the terrestrial-and-satellite-wave receiving tuner 13-2, spurious (dashed line arrow) from the terrestrial-wave input terminal due to the built-in VCO 85, and spurious (dashed line arrow) from the satellite-wave input terminal are generated, to be transmitted in the circuit.

The spurious component emerges in the form of the interfering wave (dashed line arrow) to the terrestrial-wave output terminal 16 of the receiver device 1 and the interfering wave (dashed line arrow) to the satellite-wave output terminal 33. Also, the spurious component is concerned to interfere another tuner via the circuit. That is, as the number of the tuners becomes large, the interfering wave generated from the tuner becomes large, to cause a problem of the interference to the tuner module of another housing and another tuner. For example, in the case of the tuner module that mounts two tuners including the VCO, the second-order distortion component (IM2) generated by the spurious component due to the VCO which is generated from each tuner is calculated by the following formula.

Example) a Tuner Module that Mounts Two Tuner Including VCO

The frequency oscillated by the VCO in the terrestrial-and-satellite-wave receiving tuner 13-1: 3.5 GHz The frequency oscillated by the VCO in the terrestrial-and-satellite-wave receiving tuner 13-2: 4 GHz Second-order distortion 1 ($IM2_1$): 4 GHz−3.5 GHz=0.5 GHz=500 MHz Second-order distortion 2 ($IM2_2$): 4 GHz+3.5 GHz=7.5 GHz The second-order distortion component ($IM2_1$) of 500 MHz enters into the terrestrial digital television broadcasting frequency region, and directly has an influence as the interfering wave.

Thus, in the present embodiment, an LPF is provided at the upstream of each signal input terminal of each terrestrial-and-satellite-wave receiving tuner, to cut off spurious due to the VCO and spurious due to divided frequency component of the VCO generated by the frequency divider, to attenuate spurious. Further, the distortion component, such as the second-order distortion component or the third-order distortion component due to the VCO is also attenuated, to reduce the influence of the interference on another receiver device (tuner module) and another tuner. Here, the LPF at the upstream of the terrestrial-wave input terminal and the LPF at the upstream of the satellite-wave input terminal are configured to cut off different frequency bands. The frequency bands cut off by the LPFs located at the immediate upstream of the terrestrial-wave input terminal and the satellite-wave input terminal of the tuner are different, because the reception frequency bands of the terrestrial digital television broadcasting and the satellite digital television broadcasting are different.

Figure 14:
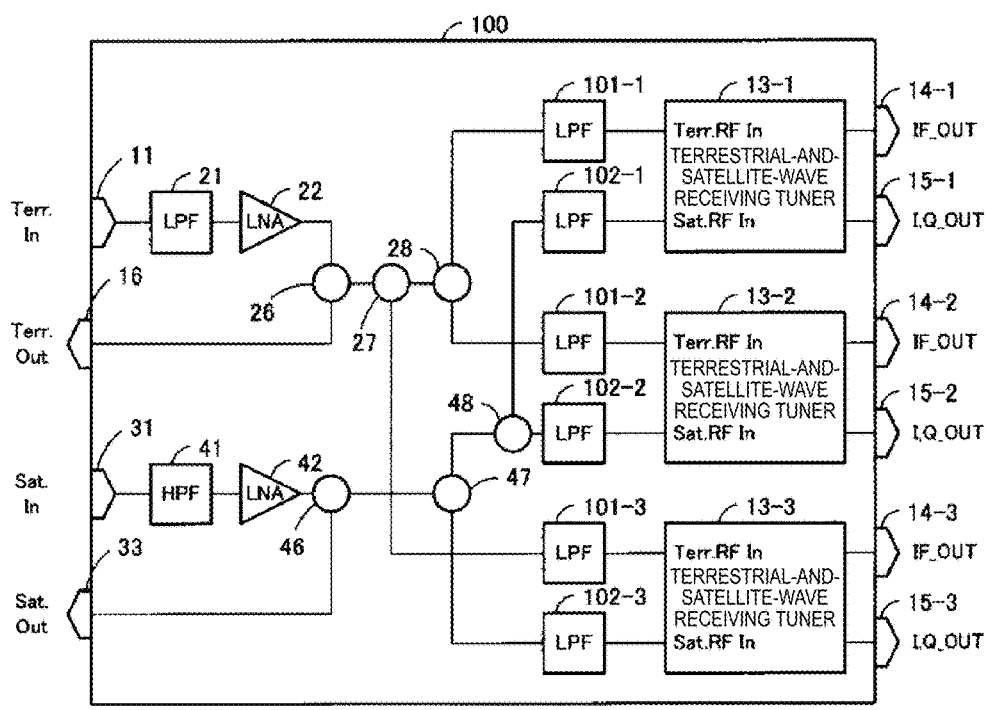
FIG. 14 is a block diagram illustrating an exemplary configuration (three tuners) of a receiver device according to a second embodiment of the present disclosure.

FIG. 14 is a block diagram illustrating an exemplary configuration of the receiver device (three tuners) according to the second embodiment of the present disclosure. In FIG. 14, parts corresponding to FIG. 8 are denoted with the same reference signs, and their detailed description is omitted.

The receiver device 100 of the present embodiment is configured such that a LPF of a predetermined cutoff frequency is provided at the upstream of the signal input terminal of each terrestrial-and-satellite-wave receiving tuner, in addition to the receiver device 1A (FIG. 8) of the first embodiment.

Three terrestrial-and-satellite-wave receiving tuners 13-1 to 13-3 are present, in the receiver device 100 having the terrestrial-wave input terminal 11, the terrestrial-wave output terminal 16, the satellite-wave input terminal 31, and the satellite-wave output terminal 33. LPFs 101-1 to 101-3 of a same cutoff frequency are connected to respective terrestrial-wave input terminals of the terrestrial-and-satellite-wave receiving tuners 13-1 to 13-3. In the same way, LPFs 102-1 to 102-3 of a same cutoff frequency are connected to respective satellite-wave input terminals of the terrestrial-and-satellite-wave receiving tuners 13-1 to 13-3. The LPFs 101-1 to 101-3 at the upstream of the terrestrial-wave input terminal are selected to cut off frequency outside the terrestrial wave frequency band, for example the frequency of the satellite wave frequency band. The LPFs 102-1 to 102-3 at the upstream of the satellite-wave input terminal are selected to cut off frequency outside the satellite wave frequency band. For example, the cutoff frequency of the LPFs 101-1 to 101-3 is approximately 1 GHz, and the cutoff frequency of the LPFs 102-1 to 102-3 is approximately 2.2 GHz.

The terrestrial broadcast signal input from the terrestrial-wave input terminal 11 passes through the LPFs 101-1 to 101-3 via the LPF 21, the LNA 22, and the distributors 26, 27, 28, and is input into each terrestrial-wave input terminal of each of the terrestrial-and-satellite-wave receiving tuners 13-1 to 13-3. In the same way, the satellite broadcast signal input from the satellite-wave input terminal 31 passes through the LPFs 102-1 to 102-3 via the HPF 41, the LNA 42, and the distributors 46, 47, 48, and is input into each satellite-wave input terminal of each of the terrestrial-and-satellite-wave receiving tuners 13-1 to 13-3.

In the present embodiment, the LPF is added at the immediate upstream of the signal input terminal of each terrestrial-and-satellite-wave receiving tuner, to attenuate the spurious component due to the VCO, which is generated in the terrestrial-and-satellite-wave receiving tuner. Thereby, the influence of the interfering wave on another receiver device (tuner module) and another tuner is reduced.

Figure 15:
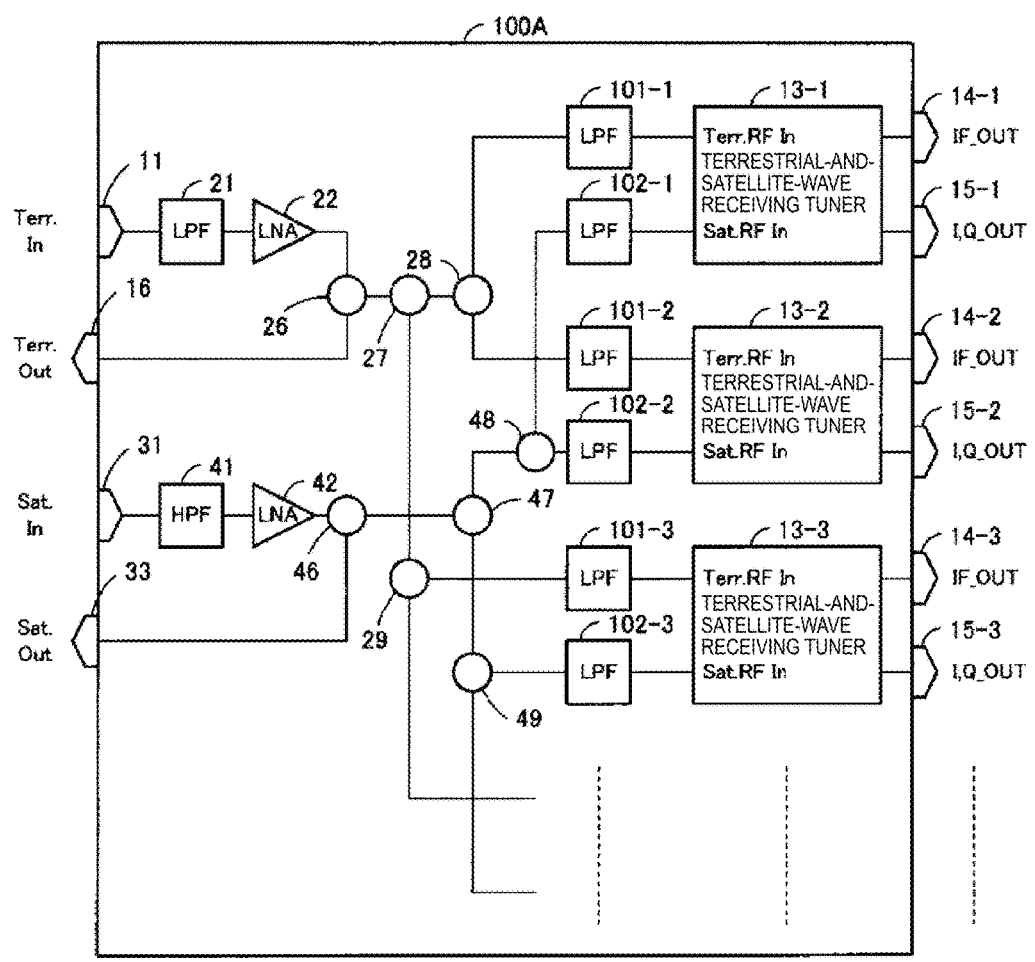
FIG. 15 is a block diagram illustrating another exemplary configuration (N tuners) of a receiver device according to a second embodiment of the present disclosure.

FIG. 15 is a block diagram illustrating another exemplary configuration (N tuners) of the receiver device according to the second embodiment of the present disclosure. In FIG. 15, parts corresponding to FIG. 14 are denoted with the same reference signs, and their detailed description is omitted.

The receiver device 100A illustrated in FIG. 15 includes distributors 29, 49 for distributing the signal to undepicted fourth and following terrestrial-and-satellite-wave receiving tuners, in addition to the receiver device 100. The distributor 29 also distributes the terrestrial broadcast signal distributed from the distributor 27, to the LPF located at the immediate upstream of each terrestrial-wave input terminal of the third terrestrial-and-satellite-wave receiving tuner 13-3 and the fourth terrestrial-and-satellite-wave receiving tuner. As described above, the terrestrial-and-satellite-wave receiving tuners of arbitrary number N are located.

According to the present example, when the number N of the terrestrial-and-satellite-wave receiving tuner is two or more, the LPF of the appropriate cutoff frequency is added at the immediate upstream of the signal input terminal of each tuner, to attenuate the spurious component due to the VCO which is generated in each tuner. Thereby, the influence of the interfering wave on another receiver device (tuner module) and another tuner is reduced.

In the meantime, the level of the signal input into each terrestrial-and-satellite-wave receiving tuner is reduced by passing through each LPF located at the immediate upstream thereof. However, in the second embodiment, the low-noise amplifier (LNA) is located at the immediate upstream of the first distributor (for example, the distributors 23, 26). Thus, even if the LPF is added at the immediate upstream of each input terminal of the terrestrial-and-satellite-wave receiving tuner, the deterioration degree of the noise figure (hereinafter, referred to as NF) of the entire high-frequency circuit of the receiver device 100 is reduced to a low value. That is, the noise figure characteristics that satisfies requested reception performance is achieved.

A tuner module equipped with a loop through splitter mounting three terrestrial-and-satellite-wave receiving tuners illustrated in FIG. 14 is assumed. The noise figure of the entire high-frequency circuit of the receiver device 100 is estimated on the basis of the gain of the LNA, the distribution loss of each distributor, the loss of the LPF, and the transmission loss generated by passing the transmission route. When each distributor and the LPF are assumed as the amplifier of the minus gain, the high-frequency circuit of the terrestrial wave system of the receiver device 100 is assumed as a four-stage amplifier including the LNA 22, distributors 26 to 28, the LPF 101-1 (101-2 to 3), and the terrestrial-and-satellite-wave receiving tuner 13-1 (13-2 to 3), for example.

The true value F of the total noise figure of the high-frequency circuit including an N-stage amplifier is expressed by below formula 1.

$$F=F1+(F2-1)/G1+(F3-1)/G1*G2+ \ldots +(FN-1)/G1*G2* \ldots *GN-1 \quad \text{(formula 1)}$$

Also, the noise figure of the entire N-stage amplifier is expressed by below formula 2 in [dB].

$$NF=10 \log(F) \quad \text{(formula 2)}$$

Note that G1, G2, G3, GN indicate gains, and F1, F2, F3, FN indicate noise figures. N is a natural number.

In the case of the tuner module equipped with the loop through splitter mounting three terrestrial-and-satellite-wave receiving tuners, the value of the total noise figure is calculated by the below formula. This time, calculation is performed for a system of totally three stages including the second stage (distributor) and the third stage (LPF) in the following example as one stage.

$$NF \text{ [dB]}=10 \log_{10}\{F1+(F2-1)/G1+(F3-1)/(G1*G2)\}$$

The gain and the noise figure of each stage have following values, for example.

The first stage, LNA gain: 14 [dB], NF: 2.5 [dB]
The second stage, distributor, number of times of distribution: 3 (loss of 9 [dB])
The third stage, LPF loss: 0.5 [dB]
The fourth stage, tuner NF: 5 [dB]
(1) A case in which a LPF is not added $$G1=10^{14/10}, F1=10^{2.5/10}, G2=10^{-9/10}, F2=10^{9/10},$$
$$F3=10^{5/10}$$

$$NF=10 \log_{10}\{F1+(F2-1)/G1+(F3-1)/(G1*G2)\}=4.38 \text{ [dB]}$$

(2) A case in which a LPF is added $$G1'=10^{14/10}, F1'=10^{2.5/10}, G2'=10^{-9.5/10}, F2'=10^{9.5/10},$$
$$F3'=10^{5/10}$$

$$NF=10 \log_{10}\{F1'+(F2'-1)/G1'+(F3'-1)/(G1'*G2')\}=4.56 \text{ [dB]}$$

As described above, in the case of the receiver device 100, the LNA circuit is used to reduce the degradation of the noise figure to 0.18 (4.56−4.38) [dB]. Note that the noise figure of each tuner is 5 [dB], and thus the noise figure (4.56 [dB]) in the entire high-frequency circuit is a better value (i.e., the noise figure is improved).

<3. Third Embodiment>

In the following, to reduce spurious due to the VCO component from the signal input terminal of the terrestrial-and-satellite-wave receiving tuner, an example that adds a switch controlled by an output signal from a general-purpose input-output terminal (GPIO) of the terrestrial-and-satellite-wave receiving tuner at the immediate upstream of the signal input terminal will be described.

Figure 16:
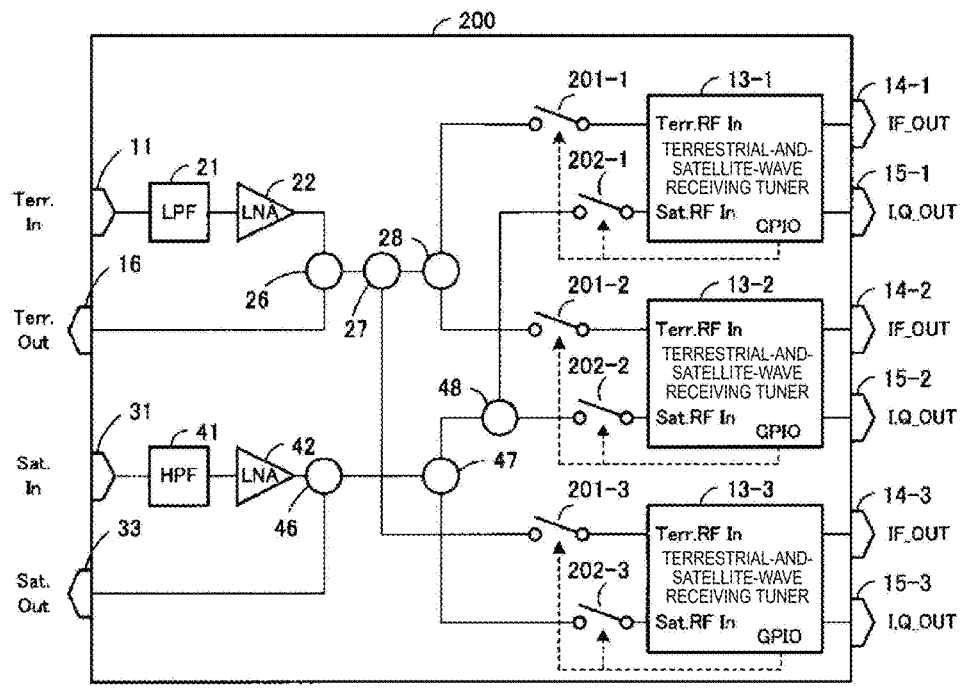
FIG. 16 is a block diagram illustrating an exemplary configuration (three tuners) of a receiver device according to a third embodiment of the present disclosure.

FIG. 16 is a block diagram illustrating an exemplary configuration of the receiver device (three tuners) according to the third embodiment of the present disclosure. In FIG. 16, parts corresponding to FIG. 14 are denoted with the same reference signs, and their detailed description is omitted.

The receiver device 200 of the present embodiment includes switches controlled by the control signal from the GPIO, at the upstream of the signal input terminal of each terrestrial-and-satellite-wave receiving tuner, in addition to the receiver device 100 (FIG. 14) of the second embodiment, instead of the LPFs.

Switches 201-1 to 201-3 are connected to respective terrestrial-wave input terminals of the terrestrial-and-satellite-wave receiving tuners 13-1 to 13-3. In the same way, switches 202-1 to 202-3 are connected to respective satellite-wave input terminals of the terrestrial-and-satellite-wave receiving tuners 13-1 to 13-3. The switches 201-1 to 201-3, 202-1 to 202-3 are configured by switching elements, such as transistors, for example. The terrestrial-and-satellitewave receiving tuners 13-1 to 13-3 include an undepicted processor (operation processor; control unit), and this processor controls ON and OFF of each switch through the GPIO.

This processor may be configured such that the function equivalent to the host CPU 54 illustrated in FIG. 3 is included in the terrestrial-and-satellite-wave receiving tuners 13-1 to 13-3, for example. Also, switches 201-1 to 201-3, 202-1 to 202-3 may be provided in the terrestrial-and-satellite-wave receiving tuners 13-1 to 13-3.

The terrestrial broadcast signal input from the terrestrial-wave input terminal 11 is input into each terrestrial-wave input terminal of each of the terrestrial-and-satellite-wave receiving tuners 13-1 to 13-3 via the LPF 21, the LNA 22, the distributors 26, 27, 28, and via the switches 201-1 to 201 to -3. In the same way, the satellite broadcast signal input from the satellite-wave input terminal 31 is input into each satellite-wave input terminal of each of the terrestrial-and-satellite-wave receiving tuners 13-1 to 13-3, via the HPF 41, the LNA 42, the distributors 46, 47, 48, and via the switches 202-1 to 202-3.

The present embodiment, includes switches controlled by the output signal from the GPIO of the terrestrial-and-satellite-wave receiving tuner, at the immediate upstream of the signal input terminal of each terrestrial-and-satellite-wave receiving tuner. The processor in the terrestrial-and-satellite-wave receiving tuner turns off (open) the switch connected to the unused terrestrial-and-satellite-wave receiving tuner, to attenuate the spurious component due to the VCO which is generated in the terrestrial-and-satellite-wave receiving tuner. Thereby, the influence of the interfering wave on another receiver device (tuner module) and another tuner is reduced.

Also, the control by the switch can be implemented in the terrestrial-and-satellite-wave receiving tuner, to provide a smaller tuner.

Figure 17:
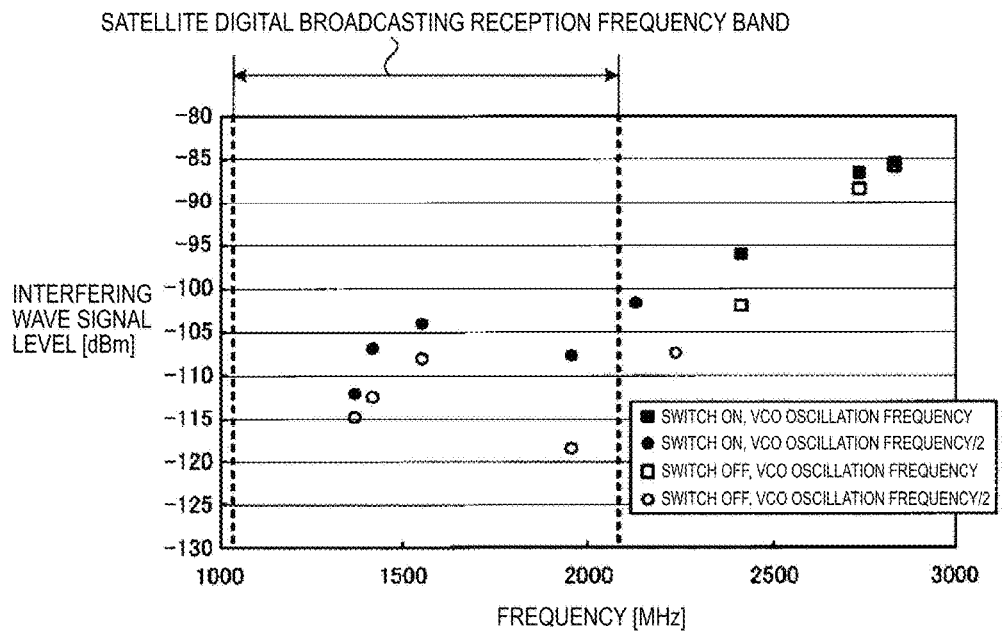
FIG. 17 is a graph illustrating exemplary frequency characteristics of an interfering wave signal level, when a switch of the receiver device of FIG. 16 is turned on and off.

FIG. 17 is a graph illustrating exemplary frequency characteristics of the interfering wave signal level (spurious amount), when the switch of the receiver device of FIG. 16 is turned on and off. This measurement, the oscillation frequency of the VCO from the satellite-wave output terminal 33 that sends the signal to the receiver device of another housing, and the interfering wave signal level of ½ oscillation frequency divided by the frequency divider are measured, while receiving the terrestrial broadcast signal.

The oscillation frequency of the VCO is higher than the frequency of the satellite broadcast signal, and overlaps the reception frequency band of the satellite digital broadcasting at ½ oscillation frequency. However, from the measurement result of FIG. 17, the attenuation of the interfering wave signal level (spurious amount) in the reception frequency band of the satellite digital broadcasting is confirmed particularly. That is, the switch controlled by the GPIO is added at the immediate upstream of the signal input terminal, and the switch is turned off when the terrestrial-and-satellite-wave receiving tuner is not used, so that the interference to another receiver device (tuner module) and another tuner by the spurious component due to the VCO is reduced effectively.

Figure 18:
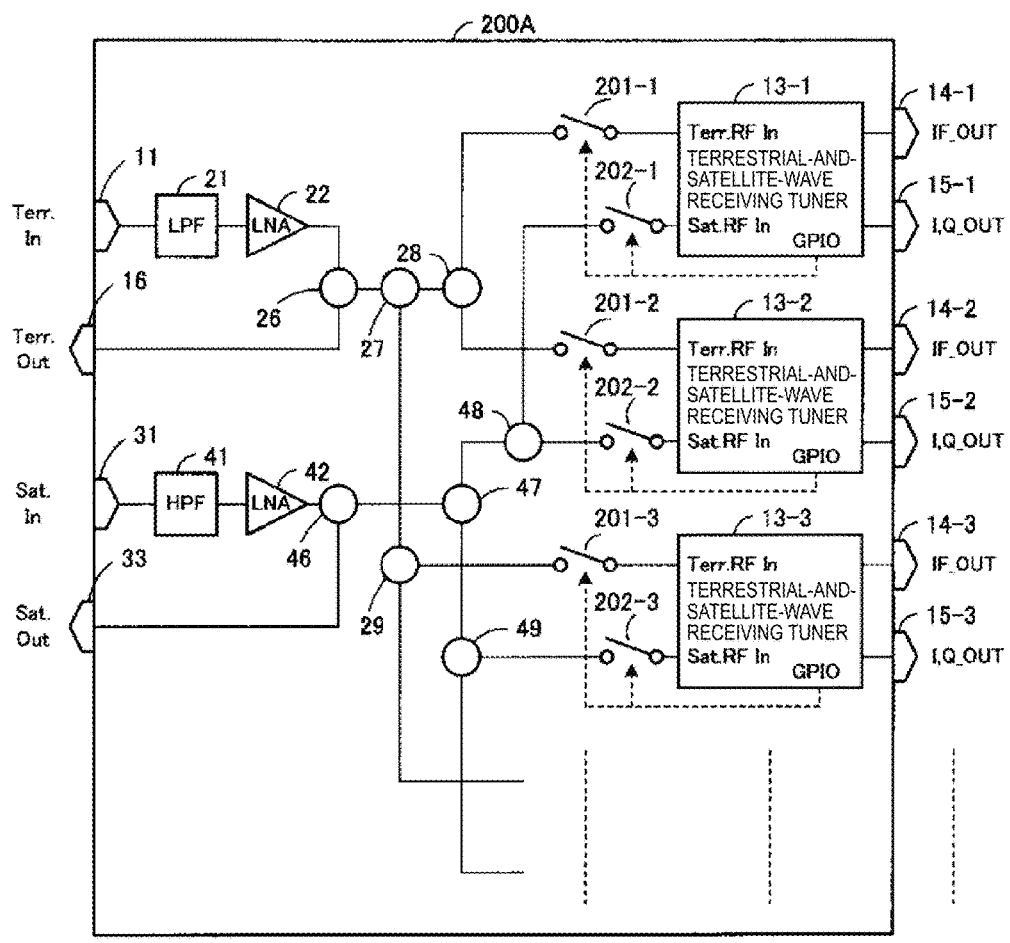
FIG. 18 is a block diagram illustrating another exemplary configuration (N tuners) of a receiver device according to a third embodiment of the present disclosure.

FIG. 18 is a block diagram illustrating another exemplary configuration (N tuners) of the receiver device according to the third embodiment of the present disclosure. In FIG. 18, parts corresponding to FIG. 16 are denoted with the same reference signs, and their detailed description is omitted.

The receiver device 200A illustrated in FIG. 18 includes distributors 29, 49 for distributing the signal to undepicted fourth and following terrestrial-and-satellite-wave receiving tuners, in addition to the receiver device 200. The distributor 29 also distributes the terrestrial broadcast signal distributed from the distributor 27, to the switch located at the immediate upstream of each terrestrial-wave input terminal of the third terrestrial-and-satellite-wave receiving tuner 13-3 and the fourth terrestrial-and-satellite-wave receiving tuner. As described above, the terrestrial-and-satellite-wave receiving tuners of arbitrary number N are located.

According to the present example, when the number N of the terrestrial-and-satellite-wave receiving tuners is two or more, the switch controlled by the output signal from the GPIO is added at the immediate upstream of the signal input terminal of each tuner, and the switch is turned off if the tuner is not used. Thereby, the influence of the interfering wave on another receiver device (tuner module) and another tuner by the spurious component due to the VCO generated in the tuner is reduced.

<4. Fourth Embodiment>

In the following, an example of the switch controlled by the GPIO and provided at the immediate upstream of the signal input terminal of the terrestrial-and-satellite-wave receiving tuner, to which a circuit connected to the ground via the resistor at the side not connected to the tuner is added, will be described.

Figure 19:
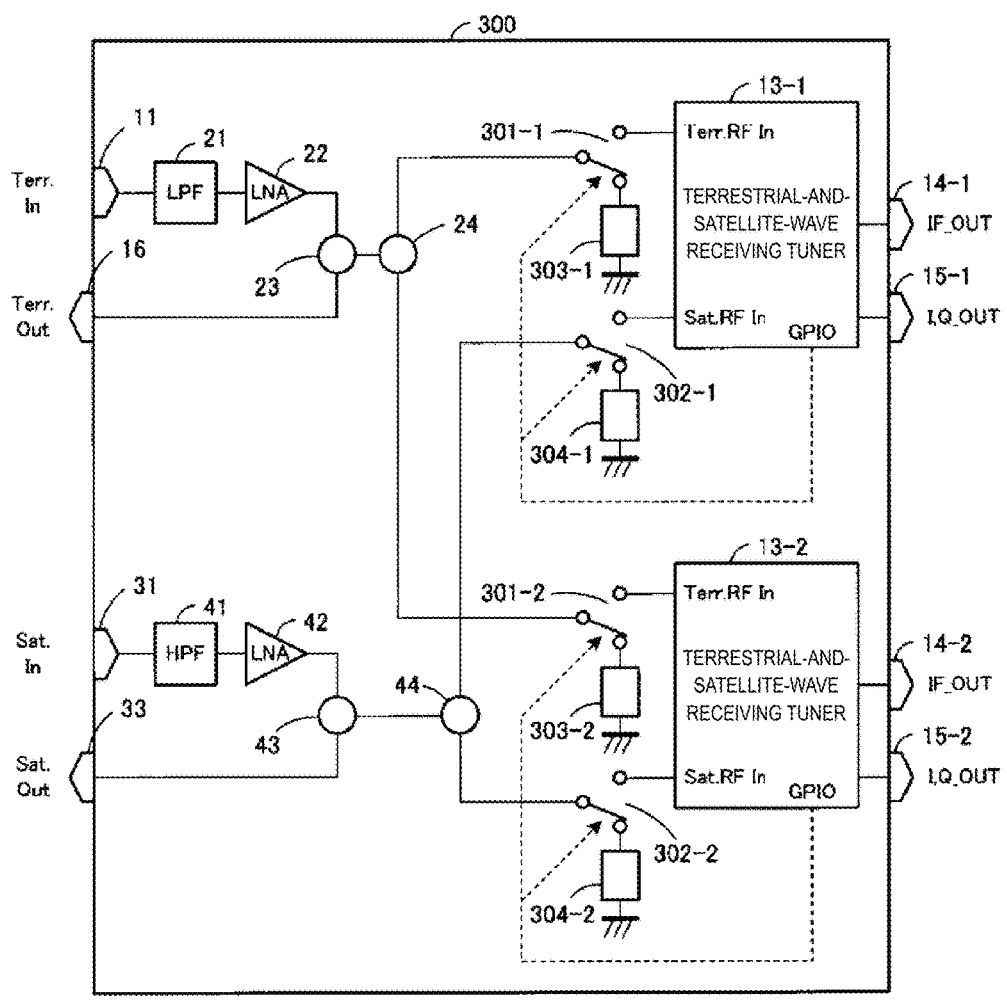
FIG. 19 is a block diagram illustrating an exemplary configuration of a receiver device according to a fourth embodiment of the present disclosure.

FIG. 19 is a block diagram illustrating an exemplary configuration of the receiver device according to the fourth embodiment of the present disclosure. In FIG. 19, parts corresponding to FIG. 16 are denoted with the same reference signs, and their detailed description is omitted.

In the same way as the receiver device 200 (FIG. 16) of the third embodiment, the receiver device 300 of the present embodiment is configured such that switches 301-1, 301-12 are connected to respective terrestrial-wave input terminals of the terrestrial-and-satellite-wave receiving tuners 13-1, 13-2, and the switches 302-1, 302-2 are connected to respective satellite-wave input terminal. The sides not connected to the terrestrial-and-satellite-wave receiving tuners 13-1, 13-2 of these switches 301-1, 301-2, 302-1, 302-2 are connected to the ground via the resistors 303-1, 303-2, 304-1, 304-2. Although the receiver device 300 is an example including two terrestrial-and-satellite-wave receiving tuners 13-1, 13-2, this example is not a limitation as a matter of course.

The switches 301-1, 301-2 are assumed to be connected to the terrestrial-and-satellite-wave receiving tuners 13-1, 13-2. The terrestrial broadcast signal input from the terrestrial-wave input terminal 11 is input to respective terrestrial-wave input terminals of the terrestrial-and-satellite-wave receiving tuners 13-1, 13-2, via the LPF 21, the LNA 22, the distributors 23, 24, and the switches 301-1, 301-2. Also, when the switches 302-1, 302-2 are connected to the terrestrial-and-satellite-wave receiving tuners 13-1, 13-2, the satellite broadcast signal input from the satellite-wave input terminal 31 is input to respective satellite-wave input terminals of the terrestrial-and-satellite-wave receiving tuners 13-1, 13-2 via the HPF 41, the LNA 42, the distributors 43, 44, and the switches 302-1, 302-2.

Also, when the switches 301-1, 301-2, 302-1, 302-2 are not connected to the terrestrial-and-satellite-wave receiving tuners 13-1, 13-2, corresponding switches of the switches 301-1, 301-2, 302-1, 302-2 are connected to the resistor, by the control of the output signal from the GPIO.

As described above, in the present embodiment, even when the switches 301-1, 301-2, 302-1, 302-2 are not connected to the tuner, the impedance is fixed without opening the circuit. This attenuates the spurious component due to the VCO which is generated in the tuner, while also obtaining more stabilized transfer characteristics, without disturbing the impedance matching of the distributor of the upstream stage of the switch. Thereby, the interference to another receiver device (tuner module) and another tuner is reduced.

Also, in the same way, the same effect is obtained by switching the connection of the switch to the tuner or to the resistor, by the control of the output signal from the GPIO in the tuner, when N tuners are arrayed. Note that, with respect to the third or fourth embodiment, the same effect as the second embodiment is obtained by using the LNA circuit.

The above first to the fourth embodiments may be combined and applied as appropriate. For example, the second embodiment may be applied to the first embodiment, or the third or fourth embodiment may be applied to the first embodiment.

Although, in the above each embodiment example, the terrestrial digital television broadcasting is taken as an example of the terrestrial broadcasting, the terrestrial analog television broadcasting may be applied as a matter of course.

Additionally, the present technology may also be configured as below.

(1)

A receiver device including:

a first input terminal to which a first broadcast signal of a first frequency is input;

a second input terminal to which a second broadcast signal of a second frequency is input;

a first distribution circuit configured to distribute a first broadcast signal input to the first input terminal, to at least two or more high-frequency processing units;

a second distribution circuit configured to distribute a second broadcast signal input to the second input terminal, to at least two or more high-frequency processing units;

a first high-frequency processing unit configured to execute a predetermined frequency conversion process in response to the first or second broadcast signal, wherein the first broadcast signal is supplied from the first distribution circuit, or the second broadcast signal is supplied from the second distribution circuit; and, a second high-frequency processing unit configured to execute a predetermined frequency conversion process in response to the first or second broadcast signal, wherein the first broadcast signal is supplied from the first distribution circuit, or the second broadcast signal is supplied from the second distribution circuit.

(2)

The receiver device according to (1), further including:

a first output terminal to which the first broadcast signal is supplied, wherein the first broadcast signal is distributed by the first distribution circuit and is input into the first input terminal; and a second output terminal to which the second broadcast signal is supplied, wherein the second broadcast signal is distributed by the second distribution circuit and is input into the second input terminal.

(3)

The receiver device according to (1) or (2), wherein the first distribution circuit and the second distribution circuit are located on different layers in a same multi-layer substrate.

(4)

The receiver device according to any of (1) to (3), further including:

a first filter configured to cut off a frequency outside the frequency band of the first broadcast signal, at upstream of an input terminal of the first high-frequency processing unit to which the first broadcast signal is input; and a second filter configured to cut off a frequency outside a frequency band of the second broadcast signal, at upstream of an input terminal of the second high-frequency processing unit to which the second broadcast signal is input.

(5)

The receiver device according to any of (1) to (3), further including:

a first switch connected to upstream of an input terminal to which the first broadcast signal of the first high-frequency processing unit is input, and configured to switch the first distribution circuit and the first high-frequency processing unit between an ON state and an OFF state;

a second switch connected to upstream of an input terminal to which the second broadcast signal of the second high-frequency processing unit is input, and configured to switch the second distribution circuit and the second high-frequency processing unit between an ON state and an OFF state; and a control unit configured to control the first switch or the second switch, to turn on the switch to which the first or second broadcast signal is input, and to turn off the switch to which the first or second broadcast signal is not input.

(6)

The receiver device according to (5), further including:

a first resistor provided between the first switch and a ground; and a second resistor provided between the second switch and the ground, wherein the first distribution circuit or the second distribution circuit is connected to the ground through the first resistor or the second resistor, when the first switch or the second switch is turned off.

Note that the series of operations in the foregoing embodiments may be executed in hardware, and may also be executed in software. In the case of executing the series of operations in software, a program constituting such software may be executed by a computer built into special-purpose hardware, or alternatively, by a computer onto which programs for executing various functions are installed. For example, a program constituting the desired software may be installed and executed on a general-purpose personal computer.

Also, a recording medium storing program code of software that realizes the functionality of the foregoing embodiments may also be supplied to a system or apparatus. It is furthermore obvious that the functionality is realized by a computer (or CPU or other control apparatus) in such a system or apparatus retrieving and executing the program code stored in the recording medium.

The recording medium used to supply program code in this case may be a flexible disk, hard disk, optical disc, magneto-optical disc, CD-ROM, CD-R, magnetic tape, non-volatile memory card, or ROM, for example.

Also, the functionality of the foregoing embodiments may realized by a computer executing retrieved program code. In addition, some or all of the actual operations may be conducted on the basis of instructions from such program code by an OS or other software running on the computer. This also encompasses cases where the functionality of the foregoing embodiments is realized by such operations.

Also, in this specification, the processing steps stating operations in a time series obviously encompass operations conducted in a time series following the described order, but also encompass operations executed in parallel or individually (by parallel processing or object-orientated processing, for example), without strictly being processed in a time series.

It should be understood by those skilled in the art that various modifications, combinations, sub-combinations and alterations may occur depending on design requirements and other factors insofar as they are within the scope of the appended claims or the equivalents thereof.

In other words, since the foregoing exemplary embodiments are ideal, specific examples of the present disclosure, various technically preferable limitations have been imposed thereon. However, the technical scope of the present disclosure it not to be limited to these embodiments, unless statements that particularly limit the present disclosure are made in their respective descriptions. For example, factors such as the types and quantities of materials used, processing times, processing sequences, and numerical conditions for respective parameters cited in the foregoing description are merely idealized examples. Furthermore, the dimensions, shapes, and positional relationships illustrated in the drawings used in the description are general and diagrammatic.

REFERENCE SIGNS LIST 1, 1A receiver device
11 terrestrial-wave input terminal
12 terrestrial-wave splitter circuit
13-1 to 3 terrestrial-and-satellite-wave receiving tuner
14-1 to 3 output terminal
15-1 to 3 output terminal
16 terrestrial-wave output terminal
17 core line
18-1 to 3 through hole
19-1 to 4 hard-wired layer
23, 24, 25, 26, 27, 28 distributor
31 satellite-wave input terminal
32 terrestrial-wave splitter circuit
33 satellite-wave output terminal
34 core line
43, 44 distributor
46, 47, 48 distributing unit
80 PLL unit
82 frequency divider
100 receiver device
101-1 to 3 terrestrial wave LPF
102-1 to 3 satellite wave LPF
200, 200A receiver device
201-1 to 3 terrestrial wave switch
202-1 to 3 satellite wave switch
300 receiver device
301-1 to 2, 302-1 to 2 switch
303-1 to 2 resistor
304-1 to 2 resistor

The invention claimed is:
1. A receiver device comprising:
a first input terminal to which a first broadcast signal of a first frequency band is input;
a second input terminal to which a second broadcast signal of a second frequency band is input;
a first distribution circuit configured to distribute a first broadcast signal input to the first input terminal, to at least two or more high-frequency processing units;
a second distribution circuit configured to distribute a second broadcast signal input to the second input terminal, to at least two or more high-frequency processing units;
a first processing unit configured to execute a predetermined frequency conversion process in response to the first or second broadcast signal, wherein the first broadcast signal is supplied from the first distribution circuit, or the second broadcast signal is supplied from the second distribution circuit;
a second processing unit configured to execute a predetermined frequency conversion process in response to the first or second broadcast signal, wherein the first broadcast signal is supplied from the first distribution circuit, or the second broadcast signal is supplied from the second distribution circuit; and
a multi-layer substrate having a top surface and a bottom surface, wherein the multi-layer substrate includes hard-wired layers and insulating layers therebetween in an alternating arrangement, wherein the first distribution circuit, the first processing unit and the second processing unit are located on the top surface of the multi-layer substrate and the second distribution circuit is located on the bottom surface of the multi-layer substrate and wherein the second distribution circuit is displaced laterally on the bottom surface of the multi-layer substrate with respect to the first distribution circuit so as to not overlap the first distribution circuit as viewed in a direction perpendicular to the multi-layer substrate, the multi-layer substrate further comprising first connections on the top surface between respective outputs of the first distribution circuit and first inputs of the first and second processing circuits, and second connections from the bottom surface by vias, through the hard-wired layers and the insulating layers, to the top surface between respective outputs of the second distribution circuit and second inputs of the first and second processing circuits.

2. The receiver device according to claim 1, further comprising:
a first output terminal to which the first broadcast signal is supplied, wherein the first broadcast signal is distributed by the first distribution circuit and is input into the first input terminal; and
a second output terminal to which the second broadcast signal is supplied, wherein the second broadcast signal is distributed by the second distribution circuit and is input into the second input terminal.

3. The receiver device according to claim 1, further comprising:
a first filter configured to cut off a frequency outside the frequency band of the first broadcast signal, at upstream of an input terminal of the first processing unit to which the first broadcast signal is input; and
a second filter configured to cut off a frequency outside a frequency band of the second broadcast signal, at upstream of an input terminal of the second processing unit to which the second broadcast signal is input.

4. The receiver device according to claim 1, further comprising:
a first switch connected to upstream of an input terminal to which the first broadcast signal of the first processing unit is input, and configured to switch the first distribution circuit and the first processing unit between an ON state and an OFF state;
a second switch connected to upstream of an input terminal to which the second broadcast signal of the second processing unit is input, and configured to switch the second distribution circuit and the second processing unit between an ON state and an OFF state; and a control unit configured to control the first switch or the second switch, to turn on the switch to which the first or second broadcast signal is input, and to turn off the switch to which the first or second broadcast signal is not input.

5. The receiver device according to claim 4, further comprising:
a first resistor provided between the first switch and a ground; and
a second resistor provided between the second switch and the ground,
wherein the first distribution circuit or the second distribution circuit is connected to the ground through the first resistor or the second resistor, when the first switch or the second switch is turned off.

6. The receiver device according to claim 1, wherein the second distribution circuit located on the bottom surface of the multi-layer substrate does not overlap the first processing unit or the second processing unit located on the top surface of the multi-layer substrate as viewed in the direction perpendicular to the multi-layer substrate.

7. The receiver device according to claim 1, wherein the multi-layer substrate further comprises a third connection on the top surface between the first input terminal and an input of the first distribution circuit, and a fourth connection from the top surface by a via, through the hard-wired layers and the insulating layers, to the bottom surface between the second input terminal and an input of the second distribution circuit.

8. The receiver device according to claim 7, wherein the multi-layer substrate includes four hard-wired layers and insulating layers therebetween.

* * * * *